Figure 1:
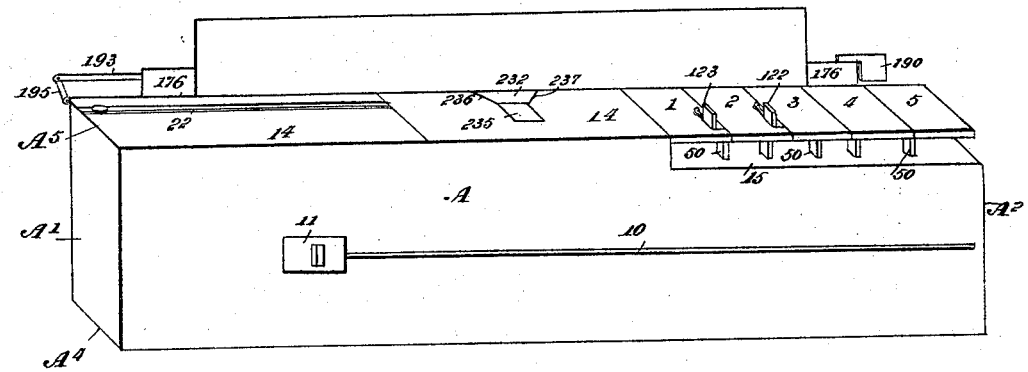

No. 638,091. Patented Nov. 28, 1899.
M. S. CARMONA.
TYPE WRITING MACHINE.
(Application filed Aug. 24, 1897.)
(No Model.) 11 Sheets—Sheet 1.

WITNESSES:

INVENTOR
M. S. Carmona
BY
ATTORNEYS.

THE NORRIS PETERS CO., PHOTO-LITHO., WASHINGTON, D. C.

No. 638,091. Patented Nov. 28, 1899.
M. S. CARMONA.
TYPE WRITING MACHINE.
(Application filed Aug. 24, 1897.)
(No Model.) 11 Sheets—Sheet 2.
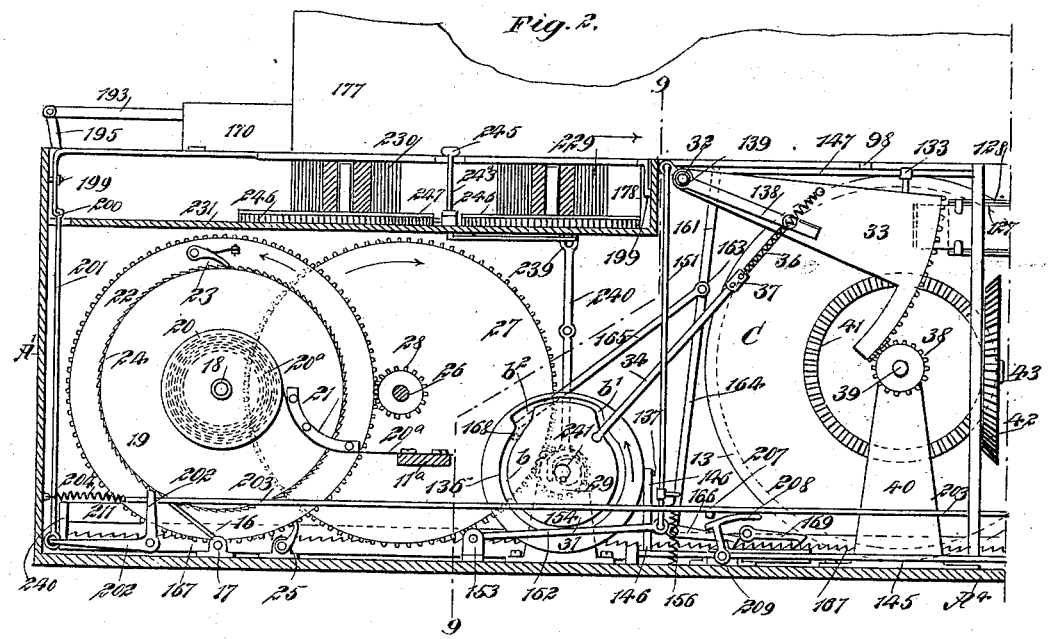
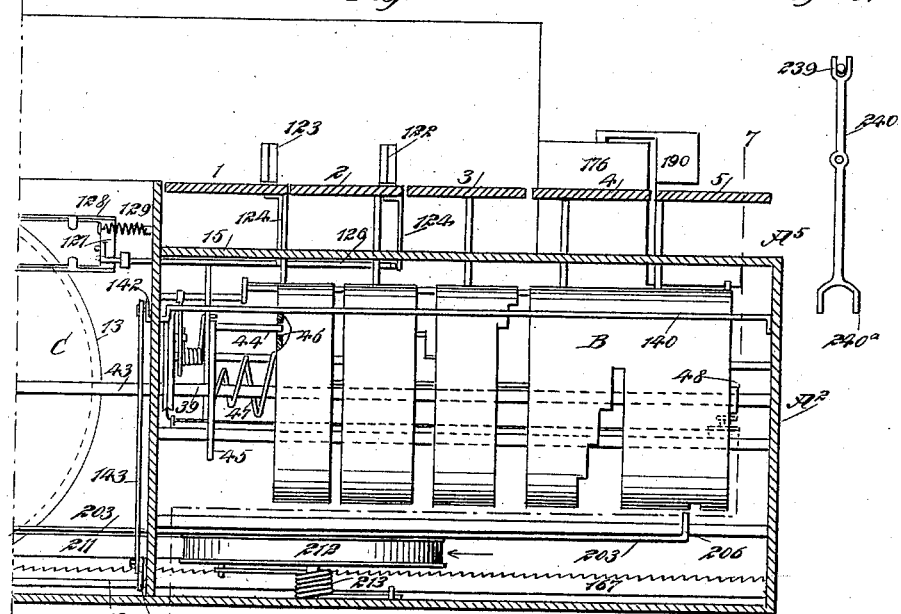

No. 638,091. Patented Nov. 28, 1899.
M. S. CARMONA.
TYPE WRITING MACHINE.
(Application filed Aug. 24, 1897.)
(No Model.) 11 Sheets—Sheet 3.
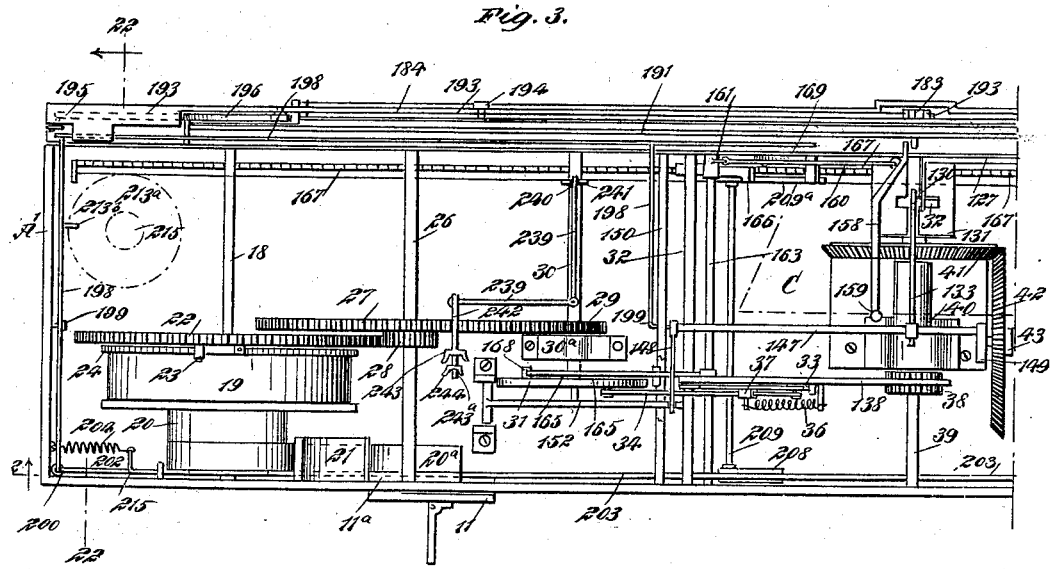
Fig. 3.
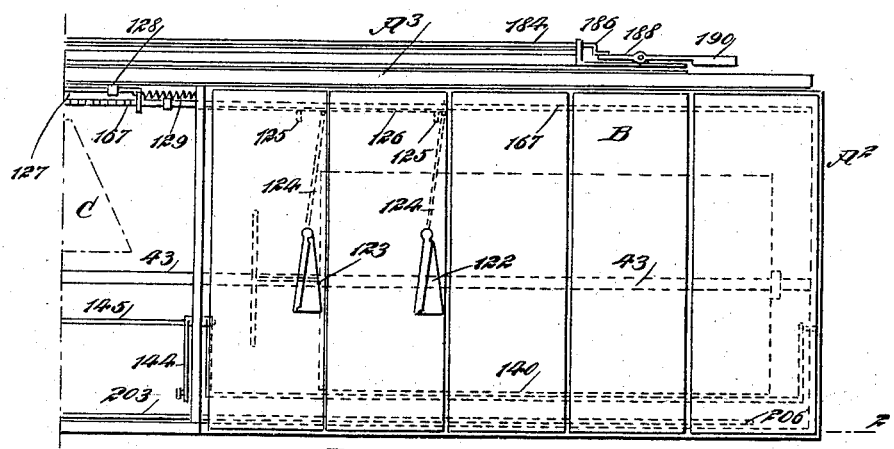
Fig. 3ª.
WITNESSES: INVENTOR
BY
ATTORNEYS No. 638,091. Patented Nov. 28, 1899.
M. S. CARMONA.
TYPE WRITING MACHINE.
(Application filed Aug. 24, 1897.)
(No Model.) 11 Sheets—Sheet 4.
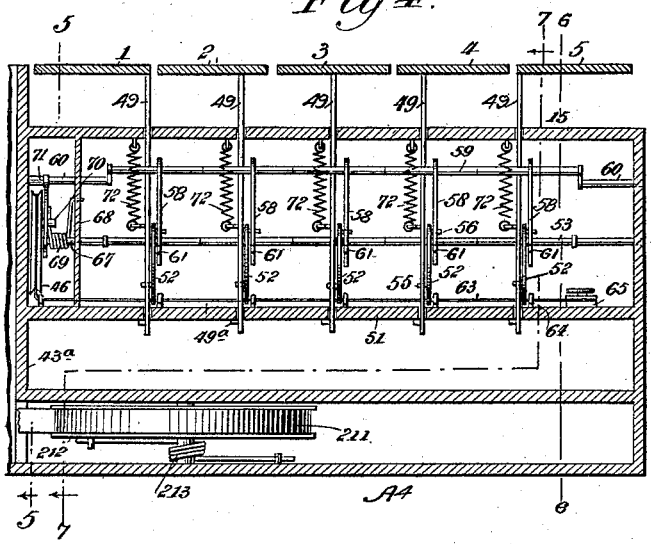
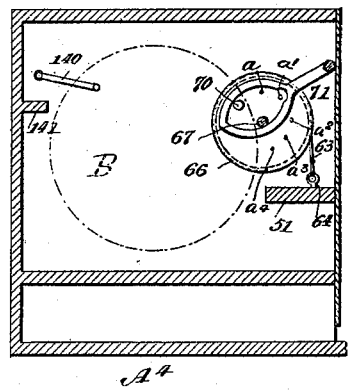
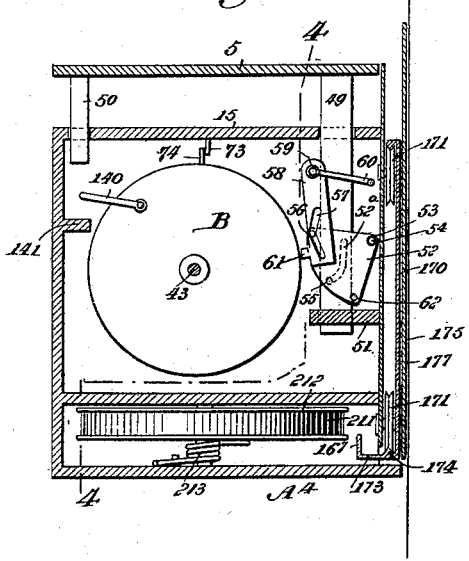
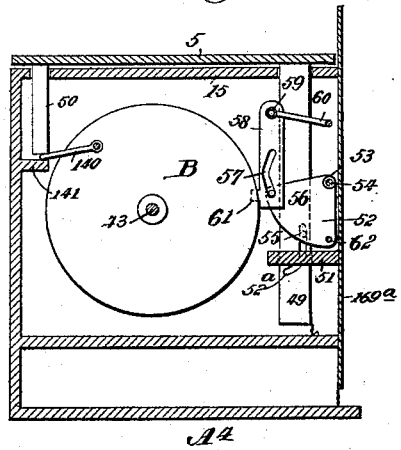
WITNESSES:
INVENTOR
BY
ATTORNEYS.
THE NORRIS PETERS CO., PHOTO-LITHO., WASHINGTON, D. C.

No. 638,091. Patented Nov. 28, 1899.
M. S. CARMONA.
TYPE WRITING MACHINE.
(Application filed Aug. 24, 1897.)
(No Model.) 11 Sheets—Sheet 5.
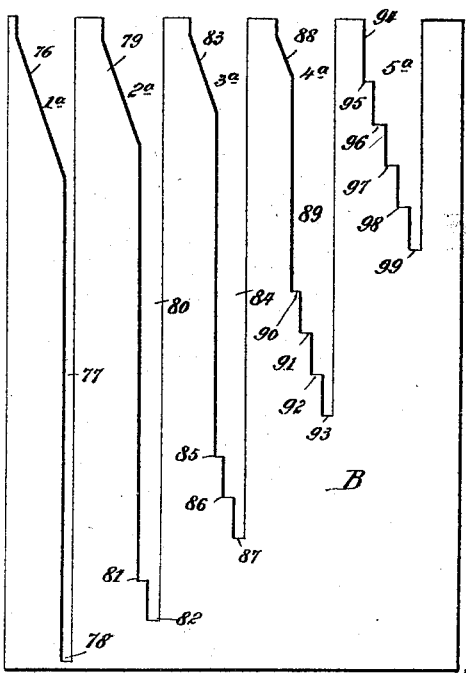
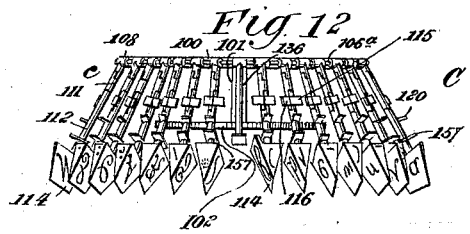
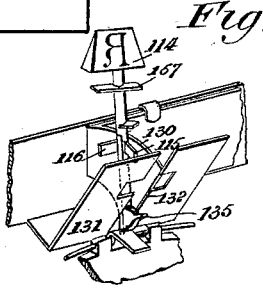
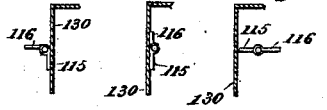

No. 638,091. Patented Nov. 28, 1899.
M. S. CARMONA.
TYPE WRITING MACHINE.
(Application filed Aug. 24, 1897.)
(No Model.) 11 Sheets—Sheet 6.
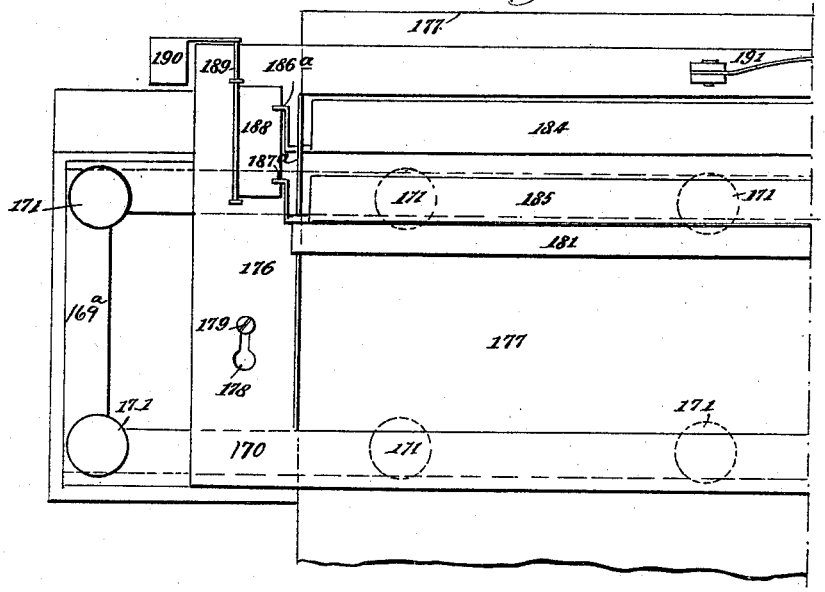
Fig. 21
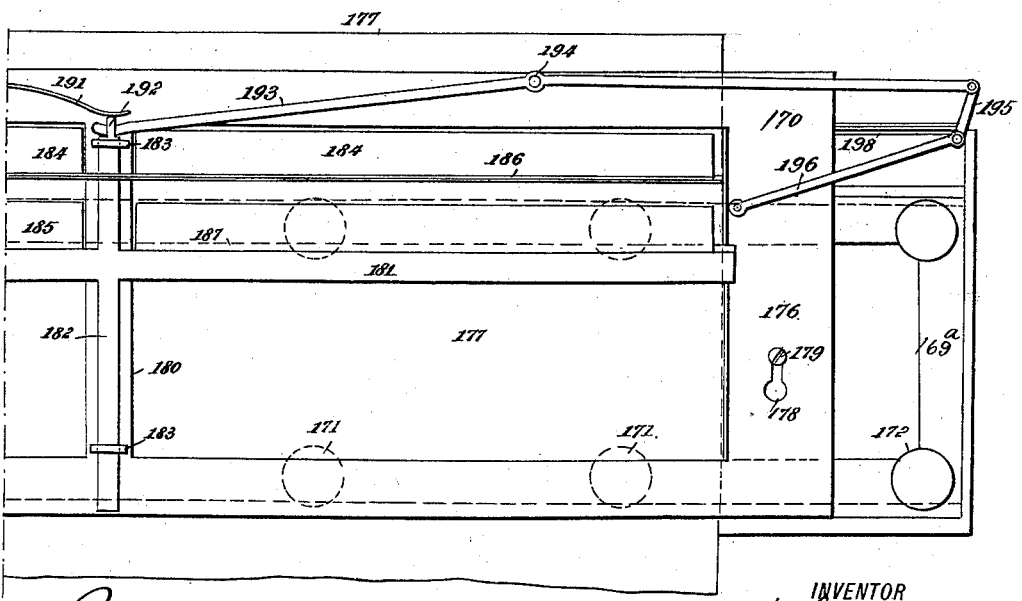
Fig. 21ª
WITNESSES:
INVENTOR
BY
ATTORNEYS.

No. 638,091. Patented Nov. 28, 1899.
M. S. CARMONA.
TYPE WRITING MACHINE.
(Application filed Aug. 24, 1897.)

(No Model.) 11 Sheets—Sheet 7.

WITNESSES:

INVENTOR
BY
ATTORNEYS.

No. 638,091. Patented Nov. 28, 1899.
M. S. CARMONA.
TYPE WRITING MACHINE.
(Application filed Aug. 24, 1897.)

(No Model.) 11 Sheets—Sheet 8.

WITNESSES:

INVENTOR
M. S. Carmona
BY
ATTORNEYS.

THE NORRIS PETERS CO., PHOTO-LITHO., WASHINGTON, D. C.

No. 638,091. Patented Nov. 28, 1899.
M. S. CARMONA.
TYPE WRITING MACHINE.
(Application filed Aug. 24, 1897.)
(No Model.) 11 Sheets—Sheet 9.
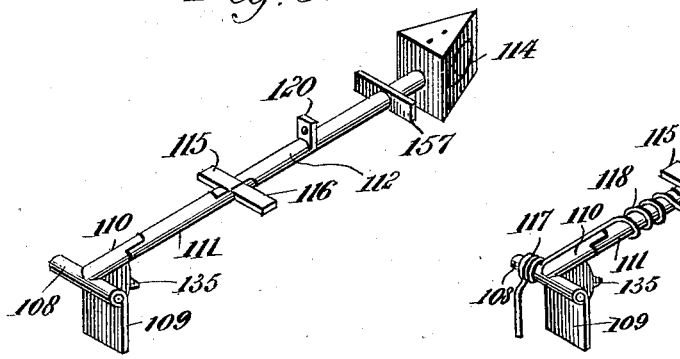
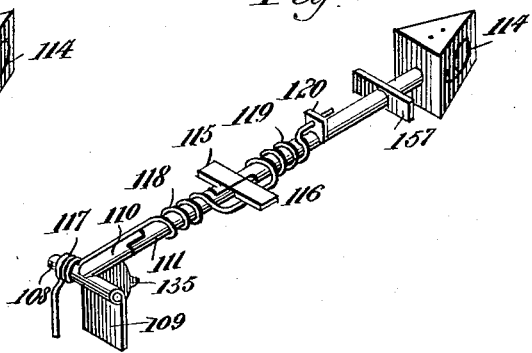
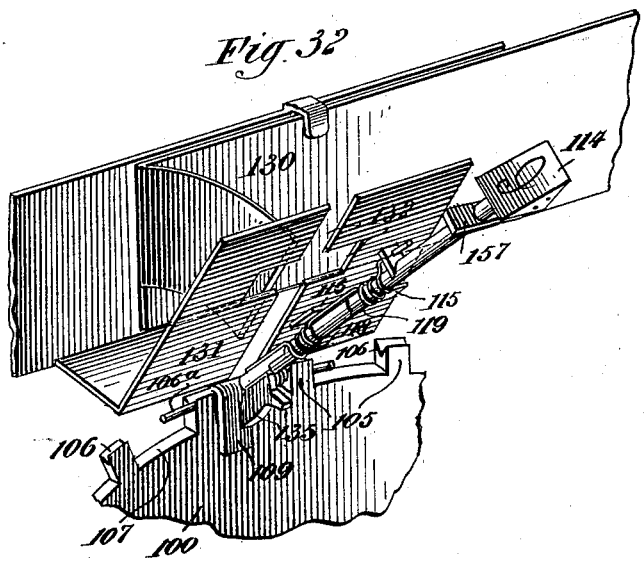

No. 638,091. Patented Nov. 28, 1899.
M. S. CARMONA.
TYPE WRITING MACHINE.
(Application filed Aug. 24, 1897.)

(No Model.) 11 Sheets—Sheet 10.

WITNESSES:

INVENTOR
Manuel S. Carmona.
BY
ATTORNEYS.

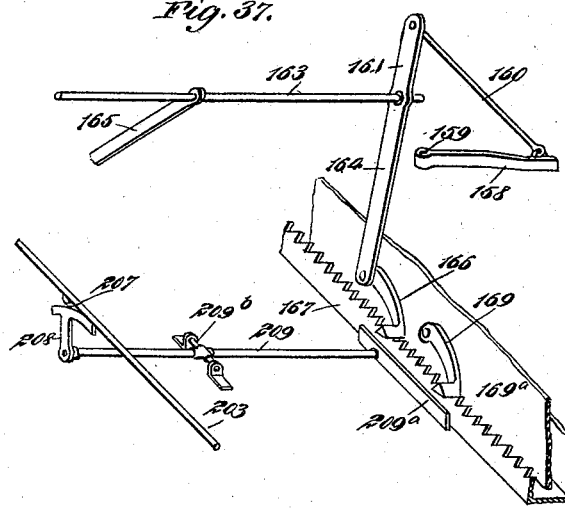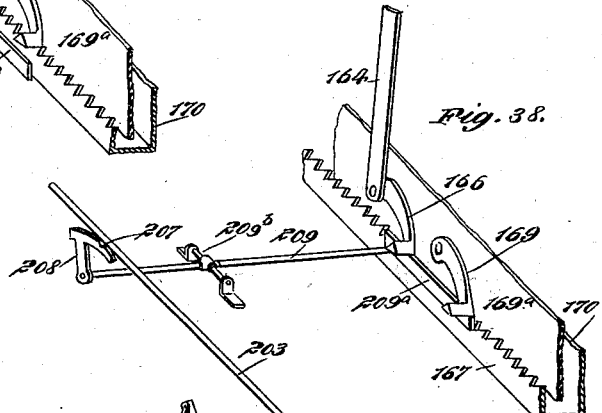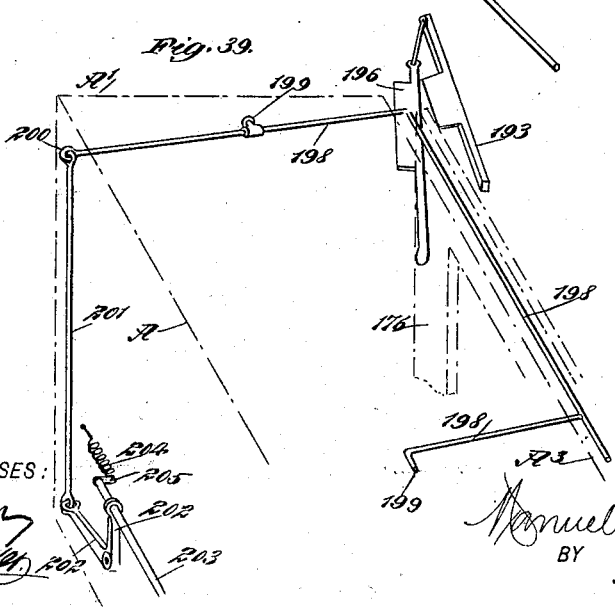

UNITED STATES PATENT OFFICE.

MANUEL S. CARMONA, OF MEXICO, MEXICO.

TYPE-WRITING MACHINE.

SPECIFICATION forming part of Letters Patent No. 638,091, dated November 28, 1899.

Application filed August 24, 1897. Serial No. 649,313. (No model.)

*To all whom it may concern:*

Be it known that I, MANUEL S. CARMONA, of the city of Mexico, Mexico, have invented a new and useful Improvement in Type-Writing Machines, of which the following is a full, clear, and exact description.

The principal object of this machine is to obtain with only five keys all the characters and signs generally employed in writing, the keys being limited to five so that the writing can be accomplished with one hand. To obtain a letter, character, or space it will only be necessary to press one key or several keys at the same time. Thirty-one characters are obtained in this way, that being the number of combinations obtained with five keys. Two auxiliary lever-keys are arranged in such manner that they can be moved by a slight inclination of the finger designed for operating the corresponding main key, thirty-one other characters being thus obtained twice over, so that the total number of characters that can be obtained with the two auxiliary lever-keys in connection with the main keys is ninety-one.

Another object of this machine is that by means of the especial mechanism the space is measured automatically, so as to correspond to each letter to be printed, enabling the form of the type and the size to be varied at will without inconvenience, and whereby in the same machine large and small letters of English script, printing-letters, Gothic, German, Greek, and Russian and other characters can be used.

A further object of the invention is to place the type at the ends of small levers, which rise to make the impression on the paper, and to mount these letters on a wheel or disk, so that this machine is intermediate in construction and operation between the machines with key-levers only and those with key-disks only and has all the advantages of both systems, with the inconvenience of neither.

Another object of the invention is to so construct the machine that the writing will be in sight, and even the last letter or character written can be seen. It is not necessary to double the paper in any way, and consequently the machine can write with equal facility on thick or on thin paper, postal cards, visiting cards, &c., and, finally, the reduced dimensions and lightness of the machine will render it easily portable.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 8:
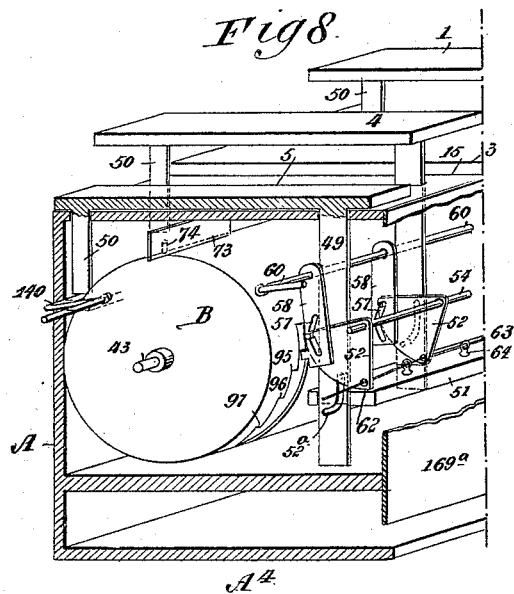
Figure 9:
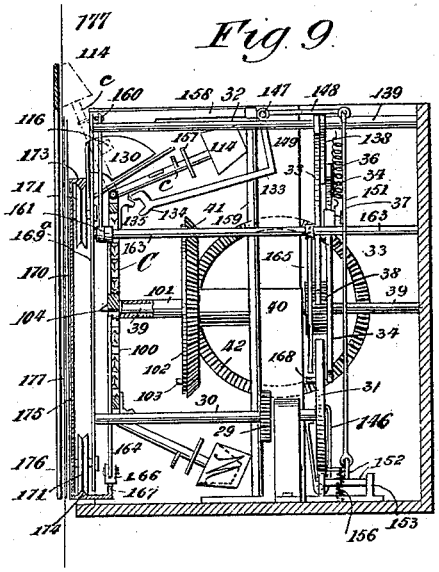
Figure 10:
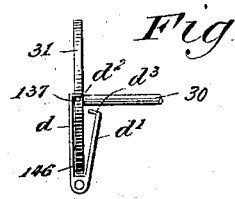
Figure 22:
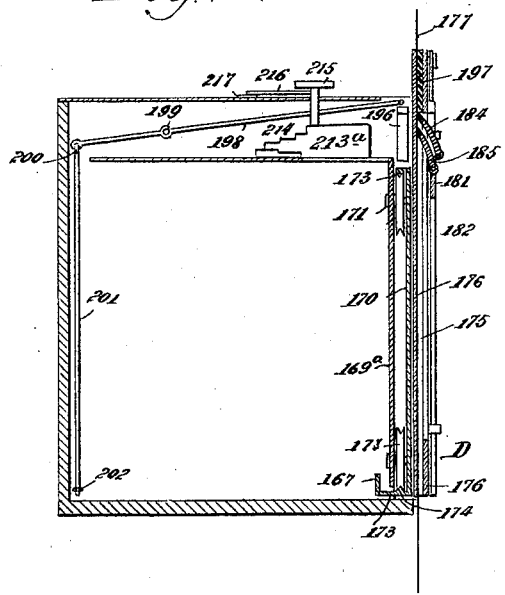
Figure 23:
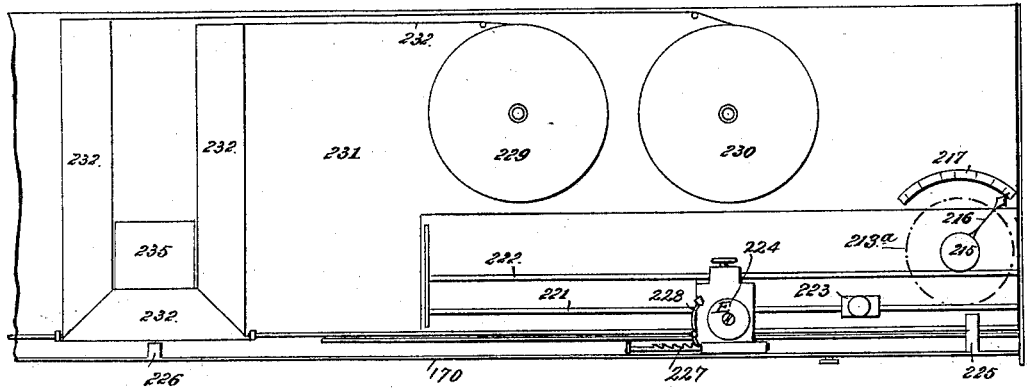
Figure 24:
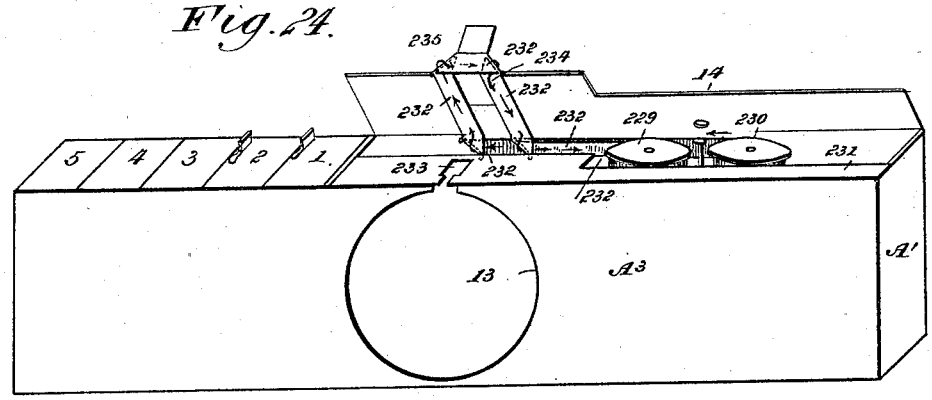
Figure 25:
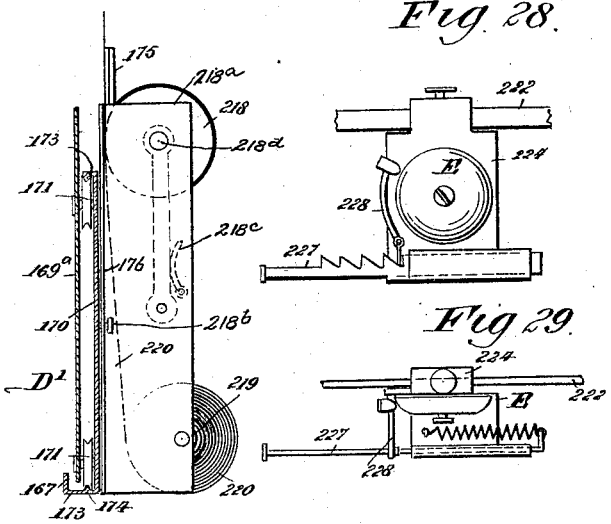
Figure 28:
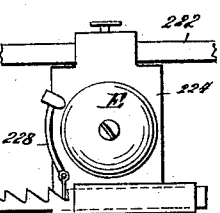
Figure 26:
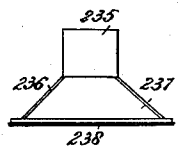
Figure 29:
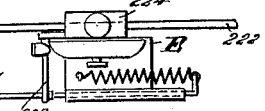
Figure 27:
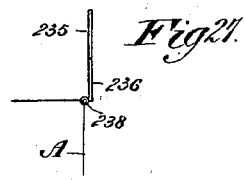
Figure 34:
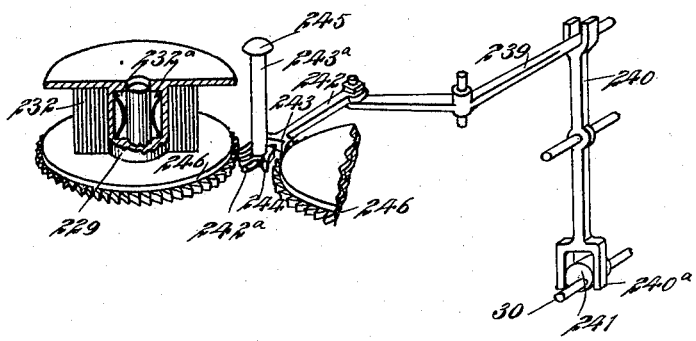
Figure 35:
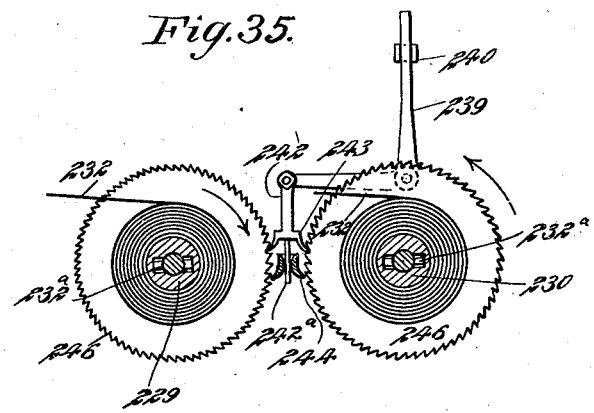
Figure 36:
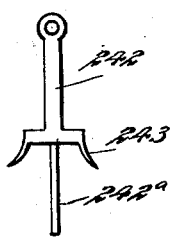

Figure 1 is a perspective view of the type-writing machine, viewed from the front. Figs. 2 and 2ª, taken together, illustrate a vertical longitudinal section of the entire machine, the section being taken just back of the front casing on the line 2 2 of Figs. 3 and 3ª. Figs. 3 and 3ª, taken together, illustrate a plan view of the interior mechanism of the machine, the top thereof having been removed. Fig. 4 is a section taken substantially on the line 4 4 of Fig. 6, illustrating the levers connected with the five main keys in front elevation. Fig. 5 is a transverse section taken practically on the line 5 5 of Fig. 4. Fig. 6 is a transverse section through the machine near one end, the section being taken practically on the line 6 6 of Figs. 2ª and 4 and illustrates the key-operated cylinder in end view, one of the keys, shown in section, being raised. Fig. 7 is a transverse section taken on the line 7 7 of Figs. 2 and 4, the key adapted for operating the cylinder having been pressed downward. Fig. 8 is a transverse section through the machine, taken at one end of the key-operated cylinder, a portion of the back of the machine-frame being broken away, the said frame being in perspective, and likewise the key-operating cylinder and parts immediately connected therewith. Fig. 9 is a transverse section taken substantially on the line 9 9 of Fig. 2, a portion of the ribbon-operating device having been omitted to disclose other parts more clearly. Fig. 10 is a detail view of the regulating-disk for the type-wheel. Fig. 11 is a diagrammatic view of the key-operated cylinder. Fig. 12 is a perspective view of the type-wheel. Figs. 13, 14, 15, and 16 are detail views of the various parts shown in Fig. 12. Fig. 17 is a perspective view of one of the centering-guards for the type-levers. Figs. 18, 19, and 20 are transverse sections through a portion of the centering-guard for a type-lever, illustrating different positions of regulating-arms with reference to the centering-guide, the adjusting-arms being carried by a type-lever. Figs. 21 and 21ᵃ, taken together, illustrate a rear elevation of the machine, illustrating particularly the manner in which the paper to be written upon is supported on the machine. Fig. 22 is a transverse section through the machine, taken substantially on the line 22 22 of Fig. 3. Fig. 23 represents a plan view of the inking device. Fig. 24 is a perspective view of the casing of the machine, viewed from the rear, the cover at the top being raised to disclose the inking device. Fig. 25 is a transverse section through the rear portion of the machine, illustrating a modified form of paper-carrier in which the paper is in rolls instead of being flat. Fig. 26 is a plan view of a portion of the ribbon-guide. Fig. 27 is an edge view of the said ribbon-guide. Fig. 28 is a side elevation of the alarm device, and Fig. 29 is a plan view of the alarm device. Fig. 30 is a perspective view of a type-lever drawn upon a large scale. Fig. 31 is a view similar to Fig. 30, the lever being shown complete. Fig. 32 is a similar view to Fig. 17, but drawn upon a larger scale, the type-lever being shown in its normal position. Fig. 33 is a detail view of a lever employed in the construction of the machine. Fig. 34 is a detail perspective view of parts of the ribbon-controlling mechanism, portions being broken away. Fig. 35 is a detail sectional plan view of the drums of the ribbon-controlling mechanism and actuating devices therefor. Fig. 36 is a detail view of the automatic shifting-arm, shown in position in Figs. 34 and 35. Fig. 37 is a detail perspective view of a portion of the carriage-feed mechanism, showing the pawls in engagement with the rack. Fig. 38 is a view similar to Fig. 37, illustrating the pawls carried out of engagement with the rack; and Fig. 39 is a perspective view of portions of the carriage-shifting mechanism.

The principle upon which the machine is based, as heretofore mentioned, is to obtain a sign, letter, or space for each combination that can be made with five keys. I will first particularly describe the manner of obtaining the different positions of the type-wheel corresponding to those combinations; secondly, the type-wheel and the manner of obtaining an impression from the type; thirdly, the space-measure will be described, and, fourthly, I will treat of the paper-carriage, its movement, and the various forms that may be given it, and, finally, I will describe the mechanism for and the manner of inking the type and detail portions and modifications of the various parts.

The casing for the machine is shown as rectangular in cross-section, comprising a front board or plate A, end boards or plates A' and A², a back board or plate A³, a bottom A⁴, and a top A⁵. A slot 10 is made in the front board, extending nearly from end to end, and a button 11 is arranged to slide over the slot from one end to the other to effect a winding of the motor of the machine. An opening 13 is made in the back board of the casing, through which the type wheel or disk is to be passed. A hinged or a movable section 14 (shown best in Fig. 24) is located at the center and left-hand portion of the casing-top; and at the right-hand front portion of the casing-top a depression 15 is made.

The five keys of the machine (designated, respectively, as 1, 2, 3, 4, and 5) are located over the depressed surface 15. A strong motor-spring 16, similar to those used in clock mechanism, is placed near the left-hand end of the casing, and one end 17 of this spring is fixed to the casing, as shown in Fig. 2, the other end being attached to a tubular shaft 18, upon which is mounted a drum 19 for the spring. A cylinder 20 is secured upon the shaft 18, around which cylinder a metallic ribbon 20ᵃ is fully coiled when the motor-spring is unwound. The metallic ribbon 20ᵃ is secured at one end to the cylinder and is attached at its opposite end to an extension 11ᵃ of the button 11. A guide 21, secured to the inner front of the casing, engages with the metallic ribbon 20ᵃ where it leaves the cylinder, as shown in Figs. 2 and 3. Whenever the motor-spring needs winding, the button 11 is carried to the right-hand end of the front slot 10, drawing the ribbon from the cylinder 20 and causing it and the shaft 18 to revolve in a direction to wind the motor-spring.

The power of the motor-spring 16 is transmitted to a gear 22, loosely mounted upon the shaft 18, the transmission being through a dog 23, carried by the gear and engaging with the toothed peripheral surface 24 upon the drum 19. A pawl 25 is in engagement with the lower portion of the gear 22, as shown in Fig. 2, and serves to prevent the gear 22 and other wheels connected with it from moving in an opposite direction to that indicated by the arrows in Fig. 2 while the motor-spring is being wound.

A second transverse shaft 26 is held to turn in the front and rear of the casing at the right of the tubular shaft 18, and a gear 27 and a pinion 28 are secured upon this shaft 26. The gear 22, operated directly from the motor-spring, meshes with the pinion 28, and the driving-gear turning with said pinion transmits sufficiently increased movement to a driving-pinion 29. The pinion 29 is mounted upon a transverse shaft 30 at the left of the center of the machine and lower than the shafts 18 and 26. The shaft 30 is journaled at its rear end in the rear wall of the casing and at its front end in a bearing 30ᵃ, attached to the bottom of the casing.

In the drawings the diameter of the pinions 28 and 29 is one-sixth of the diameter of the gears 22 and 27. Therefore for three and a half revolutions of the gear 22 the gear 27 will make twenty-one revolutions and the pinion 29 one hundred and twenty-six revolutions, corresponding to as many letters of the minimum width of two millimeters and the length of twenty-five centimeters, which is the maximum number of letters or characters that can be used with such a machine as is shown in the drawings. It will be understood that such measures are not absolute and that when the machines are being constructed they may be varied as may be found desirable or convenient.

A disk 31 is mounted on the shaft 30. This disk is one of the principal parts of the machine, because each revolution that it makes produces the principal movements of the type-wheel through the medium of various levers and connecting-rods to be hereinafter described.

It may here be stated and will be hereinafter described that at the first third of the movement of the disk 31 the type-wheel is placed in proper position to bring into action the selected type to make its impression. In the second third of the movement of the disk the type will be forced to make its impression, and in the last third of the movement of the disk all of the parts of the type-wheel and parts of the machine coöperating therewith are returned to their initial position, and the paper will move a distance equal to the width of the type by means of which the impression was made. At this time we will only note that the movement of the disk 31 is communicated to a toothed sector 33, Figs. 2 and 3, which sector is attached to the disk through the medium of a connecting-rod 34 and a spring 36, which is attached to the sector and to a sleeve 37, adjustably attached to the said connecting-rod, as shown in Fig. 2. The sector 33 is in engagement with the pinion 38, which is mounted on a shaft 39, the said shaft being supported by an elongated bearing 40. The forward end of the shaft is journaled in the front of the casing, while the rear end of said shaft is immediately opposite the center of the opening 13 in the back of the casing where the type wheel or basket C is introduced, since said type wheel or basket C, as shown in Fig. 9, is mounted upon the shaft 39.

A beveled gear 41 is secured upon the shaft 39, between the bearing for the type-wheel or basket and the bearing for the shaft, as shown in Figs. 3 and 9. This wheel 41 meshes with a second wheel 42 of the same size, which is mounted upon a shaft 43, longitudinally placed in the casing, the shaft 43 being journaled in the right-hand end of the casing and in an intermediate partition 43ª, as illustrated in Fig. 2ª. A cylinder B is mounted to slide and turn upon the shaft 43. The cylinder is held to turn with its shaft by means of a pin 44, carried by a disk 45, secured on the shaft 43, the pin 44 being adapted to enter an opening 46 in the inner end of the cylinder.

A spring 47, bearing against the disk 45 and against the inner end of the cylinder, serves likewise to keep the cylinder in its initial position always in engagement with the pin 44, this action of the spring 47 being limited by a stop 48, located near the outer end of the shaft 43, as illustrated in Fig. 2ª.

As the various positions of the type-wheel are the result of the interference of grooves or notches to be hereinafter noticed, placed in the cylinder B and in the parts directly below the keys, these parts will be minutely described, attention being called to the fact heretofore stated that the type-wheel C is introduced at the rear portion of the machine and is located on the shaft 39. The inner circle (shown in dotted lines in Fig. 2) represents the type-wheel, and likewise the dotted lines in Figs. 3 and 3ª. The cylinder B may therefore be properly termed a "controlling-cylinder."

In Figs. 4, 6, 7, and 8 I have illustrated somewhat in detail the parts which coact with or operate upon the controlling-cylinder B.

Each key is supported by two guide-standards 49 and 50, the standard 49 at the rear portion of each key being much longer than the forward standards 50. The longer standards 49 move through openings produced in a horizontal board or partition 51 at the rear of the cylinder B and extending from the right-hand end of the machine to the vertical partition 43ª. The upward movement of each key is limited by pins 49ª, passed through the lower ends of the guide-standards 49. A segmental or triangular plate 52 is provided for each of the keys. Each of these plates is mounted at its contracted end upon an independent sleeve 53, the sleeves being held to turn on a fixed shaft 54. From one side of each segmental or triangular plate 52 a pin 55 is projected, adapted to enter and to travel in curved slots 52ª, one of said slots being made in the lower portion of each key-standard 49. From the opposite side of each segmental or triangular plate, near the junction of its forward with its top edge, a second pin 56 is projected, the pins 55 being about midway between the forward lower and forward upper edges of the plates. Each upper pin 56 of each plate 52 is made to enter an angular slot 57, made in an arm 58, one of said arms being provided for each plate 52. Each arm 58 at its upper end is secured upon a sleeve 59, and each sleeve is loosely mounted upon the crank-arm of a crank-shaft 60, journaled likewise in the right-hand end of the casing or frame and the vertical partition 43ª.

Referring to Fig. 6, the key 5 is shown in its normal or initial position. Suppose the key is pressed, the said key will carry down with it the longer guide-standard 49. When this standard descends, it will cause the pin 55 in the plate 52 belonging to that key to move to the rear. By this movement of the plate or sector 52 of the key 5 the upper pin 56 will also move, tracing the arc of a circle equal to that traced by the lower pin 55, consequently causing the arm 58, connected with the sector or plate 52, to move forward, and the point 61, which is provided at the lower end of the forward edge of each arm 58, will be made to penetrate to the interior of the cylinder B. The parts will then be in the position shown in Fig. 7.

The operation will be the same when two keys are touched or pressed, the points 61 of the respective arms 58 penetrating the cylinder B. The point 61 of the arms belonging to the keys that are not touched will remain outside of or disengaged from the cylinder, as shown in Fig. 6—that is, three or four points will remain in this position, according to whether two or one key is struck. The action, however, will not be the same if three, four, or five keys are struck, but just the contrary—namely, the points 61 on the arms 58 corresponding to the keys struck will remain outside of the cylinder B, and the one or two points of the remaining keys, as the case may be, corresponding to the keys not struck will penetrate the cylinder, and, consequently, when five keys are struck simultaneously none of the points of the arms 58 will be moved in direction of the cylinder.

This is accomplished by means of the mechanism shown particularly in Figs. 4, 5, and 8, wherein it will be observed that at the lower end of each segmental or triangular plate or sector 52 an opening 62 is made, and a cord or chain 63 is passed through the openings 62 of all the sectors or plates and through guide-eyes 64, located on the horizontal partition 51, the outer end of the cord or chain 63 being attached to a block or keeper 65 of any approved construction. The opposite end of the cord or chain 63 is carried upward around and is attached to the periphery of the grooved pulley 66, which is mounted to turn on a shaft 67, located in front of the shaft 54, the said shaft being secured in the vertical partition 43$^a$ and a near-by partition 68, as is particularly shown in Fig. 4. The pulley is held in its initial or its normal position by means of a spring 69, coiled around the shaft 67, having bearing on the partition 68 at one end and at the other end being made to engage with a pin 70, which is eccentrically secured on the inner face of the pulley.

In connection with the pulley an eccentric 71 is employed, of special form, as shown in Fig. 5. This eccentric comprises an oval skeleton body which receives within it the shaft 67 and the pin 70 on the pulley, together with a shank projected from the body, which shank is attached to the inner end portion of the crank-shaft 60, as shown in Fig. 4. This eccentric, by interfering with the shaft 67, carrying the pulley and the pin 70, attached to the pulley, determines the position of the crank-shaft 60. When each one of the segmental plates or sectors 52 is moved, it will draw on the chain or cord 63, thus causing the pulley 66 to move in a certain path, and consequently causing the pin 70 to pass from the position shown in Fig. 5 to the point $a$ indicated also in said figure, the eccentric 71 not moving and the crank-shaft 60 remaining in the position shown in Figs. 4, 6, 7, and 8. If two keys are struck, the pin 70 will move to the position marked $a'$ in Fig. 5, the eccentric and crank-shaft remaining as before; but if three keys are struck the pin 70 will reach the position $a^2$ shown in Fig. 5 and the eccentric 71 will move until its upper arc touches the shaft 67 and its lower arc touches the pin 70, and consequently the crank-shaft 60 will move over the arc of a circle equal to that traveled by the eccentric 71, then remaining in the position represented in Fig. 8—that is, having caused the arms 58 to move downward a certain distance and the pins 56 of the segmental plates or sectors 52 not remaining in the center of the grooves of the arms 58 corresponding to the keys not struck, as shown in Fig. 6, but in the upper part of the grooves 52$^a$, as can be seen in Fig. 8 at key 4. This action consequently causes the point 61 of the key or keys not struck to penetrate into the cylinder, while the keys that have been struck will cause their points 61 to pass out of the cylinder, (for example, see key 5 in Fig. 8,) which is simply the consequence of the especial form of the grooves 57 in the arms 58. The result will be the same if four keys are struck, since then the pin 70 on the pulley 66 will reach the position $a^3$ shown in Fig. 5, leaving the eccentric as in the former instance, and the same action will occur if five keys are struck, since then the pin 70 of the pulley 66 will reach the position $a^4$ shown in Fig. 5, leaving the eccentric in the same position. With this mechanism it is possible to reduce all the combinations that can be made with 5 keys to five one-by-one combinations and ten two-by-two combinations. The one-by-one combinations are the five independently-operated keys 1 2 3 4 5, and these combinations correspond to the four-by-four combinations, which are also five in number—namely, the combination reading "2 3 4 5," "1 3 4 5," "1 2 4 5," and "1 2 3 4"—for, as has been stated in this case, the point 61 corresponding to the key not struck penetrates the cylinder B—that is, in the combination of the keys 2 3 4 5 the point of the key 1 operates upon the cylinder and in the combination of keys 1 3 4 5 the point of the key 2 is brought into action on the cylinder, but at a certain distance below the place where the point 61 in the combination of keys one-by-one penetrates. In the same way the combinations of two-by-two keys are ten—namely, keys 1 2, 1 3, 1 4, 1 5, 2 3, 2 4, 2 5, 3 4, 3 5, and 4 5. For the ten combinations of keys corresponding to those taken three by three the following groups of keys are simultaneously operated: 3 4 5, 2 4 5, 2 3 5, 2 3 4, 1 4 5, 1 3 5, 1 3 4, 1 2 5, 1 2 4, and 1 2 3; for in the three-by-three combinations of keys—that is, striking three keys—the points 61 appertaining only to the two keys not struck penetrate the cylinder. In the first case the points of the keys 1 and 2 enter the cylinder, in the second the keys 1 and 3, &c.; but, as in the former case, the points enter the cylinder a certain distance below where the key-points in the two-by-two combinations penetrate the cylinder. In regard to the last combination of keys 1 2 3 4 5, which consists in striking all five keys at the same time, all the key-points 61 will be carried away from the cylinder, so that the cylinder turns freely until a stop 73 at the top of the casing strikes a stop 74 on the cylinder, as shown in Figs. 6 and 8. In this manner the thirty-one combinations that can be made with five keys are reduced to five one-by-one combinations, which are received in the cylinder B twice; ten combinations of two-by-two keys, which are also received twice, and the single combination of five-by-five keys.

I will now describe the cylinder B, which will finish the explanation of this portion of the mechanism. In Fig. 11 I have shown the cylinder B as unrolled or flat. The surface of the cylinder is divided into five zones, $1^a$, $2^a$, $3^a$, $4^a$, and $5^a$, which zones are respectively adapted to intersect or receive the points 61 of the arms connected with the five keys, which keys have been heretofore designated as 1, 2, 3, 4, and 5. With reference to the zone $1^a$, corresponding to the key 1, Fig. 11, in the upper part of this zone an inclined cut 76 is produced, which cut afterward continues vertically, as shown at 77, terminating at its closed end in a wall 78. In the zone $2^a$, corresponding to the key 2, the inclined cut 79 is shorter, the vertical section 80 being wider and terminating in two steps 81 and 82. In the zone $3^a$, corresponding to the key 3, the inclined cut 83 is still shorter, and the vertical portion 84 of the cut is wider and terminates in three steps 85, 86, and 87. The zone $4^a$ has an inclined cut 88, which is still shorter, the vertical section 89 of said cut being wider, terminating in four steps 90, 91, 92, and 93. Finally, in the zone $5^a$ there is no inclined cut, but a straight cut 94, having one of its sides provided with five steps 95, 96, 97, 98, and 99. The zones or cuts are graduated in length, the zone $1^a$ being the longest.

Suppose the key 1 to be touched—that is, we cause its point 61 to penetrate the cylinder B at the inclined portion 76 of the zone $1^a$. When the cylinder turns, (a movement equivalent to an upward movement in the diagrammatical view Fig. 11,) it will turn in the direction of the front of the casing, the inclined cut portion of the zone $1^a$ sliding on the point 61 of the key 1, not stopping until said point 61 engages the stepped or closed end 78 of the first zone or cut, permitting the impression of a letter or sign on the type-wheel C, to be hereinafter described, corresponding to that position of the cylinder. It will be understood that whenever a key-point 61 enters a zone the cylinder is forced to the left and is brought in driving engagement with the shaft 43 through the medium of the pin 44, heretofore referred to and carried by said shaft.

If the key 2 is struck, the result will be the same as that just described, the movement of the cylinder ceasing when the point 61, corresponding to this key, engages the step 81 of the second zone, thus permitting the impression of another letter or sign corresponding in the type-wheel to this new position of the cylinder. In a similar manner the cylinder will be stopped when the point 61, corresponding to the key 3, engages the step 85 of the third zone, and when the key 4 engages the step 90 of the fourth zone, and also when the point of the key 5 engages the step 95 of the fifth zone. We have thus five positions of the cylinder, each corresponding to five levers on the type-wheel C and to the five "one-by-one" combinations.

With reference to the two-by-two combinations the first consists in striking at the same time the two keys 1 and 2. Their points 61 penetrate the cylinder, which turns toward the front, as stated, the inclined cut portions of the zones $1^a$ and $2^a$ sliding on the points 61; but as the inclined portion of the zone $1^a$ is longer than the corresponding portion of the zone $2^a$ and embraces a zone of the cylinder equal to four and a half times the width or tread of the step, while the cut on the second zone is only three and a half times such width, the cylinder will move to the left to present the proper type upon the type-wheel, being caused to do so by the point 61 of the key 1. The movement of the cylinder to the left is a distance which corresponds to the inclined cut portion of this zone, and consequently its movement is stopped when the point 61 of the key 2 engages the step or closed end 82 of the zone $2^a$, which gives another letter or sign corresponding to the combination "1 2."

The second combination corresponds to the keys 1 to 3. When their two points penetrate the cylinder and the latter moves, they cause it to move to the left by means of the point 61 of the first key acting upon the inclined surface of the cut of the first zone $1^a$ for the distance that this portion of the zone causes the cylinder to move, which is, as has already been stated, four and a half times the width of a step, such being the length of the inclined surface belonging to this zone, while that of the zone $3^a$ is only two and a half times that width. Therefore the point 61 of the third key entering the zone $3^a$ will be the one to stop the cylinder when said point engages the step or closed end 87 of the third zone. A like action will take place when the keys 1 to 4 are struck, for the movement of the cylinder caused by the action of the point 61 of key 4 on the inclined portion of zone $4^a$ is only one and a half times the width of a step, so that this time, as before, the end movement of the cylinder depends on the point 61 of the key 1. The point of the key 4 striking the stop or closed end 93 of the fourth zone determines the extent of the rotary motion of the cylinder. In the combination "1 5" the extent of end movement will be determined by the point of the key 1 striking the inclined surface of the first zone, and the cylinder will be stopped from rotating when the point of key 5 engages with the step or end portion 99 of the fifth zone. The explanation of the combinations "2 3," "2 4," and "2 5" is similar, the difference being that the movement of the cylinder in these cases is three and a half times the width of the step which corresponds to the key 2, which is the first of these combinations, the movement of the cylinder being longer when such key is operated than is the case in the operation of the keys 3, 4, or 5, so that, as will be understood in the combination "2 3," the cylinder will engage with the point 61, corresponding to key 3 at the step 86 of the third zone. In "2 4" it will stop when the point 61, corresponding to the key 4, engages the step 92 of the fourth zone, and in "2 5" the step 98 will be the one that stops the rotation of the cylinder.

For the combinations "3 4" and "3 5" the point 61, corresponding to key 3, will control the end movement of the cylinder, and the points 61, which correspond to the keys 4 and 5, will in each case control the degree of rotation of the cylinder, striking, respectively, the steps 91 and 97, and, finally, the step 96 will correspond to the combination "4 5." Thus is indicated the ten corresponding positions of the cylinder in the two-by-two combinations.

From the above it is evident that fifteen combinations on the cylinder have been obtained corresponding to the one-by-one and two-by-two combinations, embracing positions of the cylinder marked 78, 81, 85, 90, and 95; 82, 87, 93, and 99; 86, 92, 98, 91, 97, and 96, disclosed in Fig. 11, and the steps enumerated are equidistant and correspond to an equal number of levers in the type-wheel, which are also placed equal distances apart.

Referring to the type-wheel, there are fifteen levers employed with their corresponding type in addition to the fifteen already mentioned and placed between the latter, which fifteen additional levers correspond to the fifteen three-by-three and four-by-four key combinations. The study of these other fifteen combinations is very simple, since, as has been shown, they are complementary to the fifteen one-by-one and two-by-two combinations and equivalent to them. Note Fig. 11 of the drawings and suppose, for example, the combination of keys 3 4 5, in which case, as has been seen, the points 61, corresponding to the keys 3 4 5, will not be the ones to penetrate the cylinder; but the points of the keys which have not been struck—namely, the points 61 of the keys 1 2—will be the ones to penetrate said cylinder, but at a certain distance below the position where the key-points 61 would engage with the cylinder in carrying out the key combination "1 2," this distance being exactly equal to half the length or height of one step, so that in the case just set forth the cylinder will stop again when the step 82 is engaged by the point 61, corresponding to the second zone, but at a distance equal to half the height of a step lower down, which in this case corresponds to two-by-two combination, for the points 61 will now be this distance lower in order that the type-wheel C shall present for the impression the lever between those of the combinations corresponding to the steps 82 and 78. In the combination "2 4 5," which corresponds to the combination "1 3," the step 87 will be the one engaged by the new lever corresponding in this case half a step lower down than that marked in the corresponding case 1 3, referred to above, &c. The same will happen in the four-by-four combinations, which will be equivalent to one-by-one combinations. For example, the combination "2 3 4 5," which is equivalent to "1," will be marked by the step 78 at the distance of half a step lower down than in the event the key 1 were struck. The combination "1 2 3 4" is equivalent to the single key 5 and will be determined by the step 95, and the key will be stopped half a step lower down than in the equivalent case, &c., so that the fifteen other combinations corresponding to the three-by-three and four-by-four combinations have been provided for. It is thus seen how by means of the cylinder B the thirty-one one-by-one, two-by-two, three-by-three, four-by-four, and five-by-five combinations are determined, which correspond to the thirty-one levers of the type-wheel C, and at this point it may be stated that the five-by-five combination is the one used for spacing and corresponds to one type-wheel lever without type, which is shown in the type-wheel, Fig. 12.

With reference to the type-wheel and the printing said wheel C consists of a disk 100, provided with an attaching-sleeve 101, adapted to be carried over the rear end of the shaft 39, as shown in Fig. 9. A second disk 102 is attached to the forward end of the sleeve 101, the forward disk 102, which is smaller than the rear disk 100, being made to engage with the back of the beveled gear 41, also shown in Fig. 9, being compelled to turn therewith by a pin 103, fastened to the gear and passing through an opening in the disk. A latch 104 of any approved description is located at the rear end of the shaft 39 and engages with what may be termed the "crown-disk" 100 of the type-wheel, as is also shown in Fig. 9, preventing the wheel from leaving the shaft 39, yet admitting of its being readily taken off when desired. The periphery of the crown-disk 100 is provided with lugs 105, arranged at equal distances apart, a groove 106 being made in the outer end of each lug, as shown in Fig. 15, the space between the lugs being designated as 107.

Each type-lever c, carried by the type-wheel, with the exception of one to be hereinafter noted, consists of a knuckle 108, adapted to fit within a recess 107, (see Figs. 13 and 15,) the knuckle being provided with a flange 109 engaging with the front face of the crown-disk to determine the angularity of the aforesaid lever. A sleeve 110 is secured to the knuckle 108, having a recessed outer end, and the body of the lever consists of two tubular sections 111 and 112, both sections being held to turn upon a rod 113, which is passed through them and is attached to the sleeve 110. The rear section 111 of the lever is adapted to turn about ninety degrees in the direction of the right-hand end of the machine, and the forward section 112 is adapted to turn to the right with the rear section and turn independently toward the left-hand end of the machine about ninety degrees. When the levers are placed in the spaces between the lugs 105 of the crown-disk of the type-wheel, they are hinged or pivoted thereon usually by passing a wire 106$^a$ through all the knuckles and across the grooved portions of the lugs 105 and securing the wire at its ends in any approved manner, as shown in Figs. 12, 13, 14, 15, 16, and 17.

At the forward or free end of each type-lever an angular head 114 is secured to the outer tubular body-section 112, these heads being preferably of an angular shape, their bases facing the rear. An arm 115 is attached to the outer tubular section 112 of each type-lever, and another arm 116 is attached to the rear tubular section 111. These arms are placed end to end and are located on the tubular body-sections where the said sections come together. In connection with each type-lever a spring $c'$ is employed. (Shown in detail in Fig. 14.) This spring is provided with a coil 117, arranged to be passed over the knuckle of a type-lever and have bearing against the upper face of the crown-disk of the type-weeel, as shown in Fig. 16, the spring is then carried forward at an angle to the rear coil 118, which is made to surround the rear tubular body-section 111, and, finally, a second and right-hand coil 119 is made near the forward end of the spring, which closely embraces the outer tubular section 112, the forward end of the spring being secured to a post 120 near the forward end of the lever, as shown in Fig. 16.

Two levers 122 and 123 have movement in two of the keys, usually the keys 1 and 2, being adapted to bring in printing position either the upper or the lower case type on the type-wheel. These levers, as shown in Fig. 2$^a$ especially, being also shown in Fig. 3$^a$, each have a rod 124 projected downward therefrom, entering the casing and engaging with offsets 125, located on the shifting rod 126, held to slide at the back of the casing, as shown in Figs. 2$^a$ and 3$^a$. The inner end of the shifting rod 126 engages with a shifting plate 127, held to slide in a frame 128, secured to the back portion of the casing, as shown in Fig. 2$^a$. The shifting plate 127, together with the shifting rod 126, is held in its normal position by means of a spring 129. When the shifting rod 126 is acted upon by either of the shifting levers 122 and 123, the spring 129 is placed under tension, and one of the shifting levers will impart a much greater throw to the shifting plate 127 than the other. Since there is lost motion between one lever and the parts moved thereby, the shifting plate 127 is actuated by this particular lever a shorter distance than by its mating lever.

At the inner end of the shifting plate 127 a forwardly-extending segment 130 is formed. This segment extends to a loose engagement with a guide-plate 131, comprising a horizontal base-section and an upwardly and forwardly inclined body-section, as shown in Fig. 17, the body-section being provided with an opening 132, usually of cruciform shape. An impression-lever 133 (shown in Fig. 9) is employed for lifting the uppermost type-lever. Said shifting lever, whose operation will be hereinafter set forth, is provided at its rear end with a fork 134, adapted to receive a tooth-like projection 135, one of which is upon each type-lever at the junction of the sleeve 110 with the knuckle 108.

When a type-lever is to be raised, the upper member of the fork 134 of the impression-lever 133 will engage directly with the under face of the type-lever, carrying the same upward, the toothed projection 135 being received between the members of the fork engaging with the upper member of said fork when the type-lever is in its upper position. When the impression-lever returns to its initial position, the type-lever is returned also to its initial position through the medium of its attached spring. The heads 114 of the type-levers being triangular present many faces, and as thirty-one type-levers are usually employed, although a greater or a less number may be used, I am enabled to print thirty signs or characters, placed, for example, on the outer or what may be termed the "trapezia" faces of the type-carrier heads, as shown in Fig. 12. The head of each type-lever has at least three type-faces. Usually on the outer or front faces twenty signs or characters are made and ten numbers, while on the trapezia faces at the left small letters are produced, and on the trapezia faces at the right the capitals are formed, making a total of ninety types and a space, at which space a plain lever 136 is carried by the wheel in like manner as the type-levers. The lower triangles or trapezia faces could be used, if desired, especially when the types are in the opposite triangles or trapezia faces, since, when on account of their size or shape some are a little larger than the space, it is preferable that they should not occupy the rear triangle or trapezia face of a head. It is possible to place the type thus even when a type occupies a slightly-greater length and width than ordinarily by enlarging the face of the impression-head on which the type are produced, as shown in Fig. 12 and as likewise shown in full lines in Fig. 9. Such an enlargement is required principally with the capitals of the English script. Note, for example, the letter "M" in the front impression-head in Fig. 9 and the space required for the script small letter "f" in Fig. 12, where the suitable enlargement is made without any inconvenience and such an enlargement would probably need to be made for the script letters "g," "j," "p," "q," and "y." These difficulties, however, occur only with the ordinary script of a particularly large size, for with the other forms of type there is no difficulty.

The operation of obtaining, when desired, any of the thirty signs placed in the triangles outside of the type-wheel or thirty small letters or signs placed in the trapezia face at the left or the thirty capitals or signs in the trapezia face at the right is as follows: In Fig. 17 a type-lever is shown in printing position—that is, neither of the shifting levers 122 and 123 has been touched. Under these conditions when a type-lever is raised the arm 115 of this lever strikes the segment 130 upon its outer face, as shown particularly in Fig. 18, causing it to turn ninety degrees to the right and present a small letter to the paper. When the shifting lever 123 is brought into action, the segment 130 is advanced, as shown in Fig. 19, and takes such a position that when the type-lever rises it brings the arm 116 in engagement with the inner face of the segment, turning the said arm ninety degrees to the left, presenting to the paper a capital letter, as shown in Fig. 32. If the shifting lever 122 is manipulated, the segment takes the position shown in Fig. 20 so far in advance of the arms 115 and 116 of the type-lever as not to act thereon—that is to say, the type-lever will rise supported by the spring mounted upon it without inclining to either side and present its normal type-face to the paper. When the type-levers return to their normal position, they are held in place by the springs which they carry, and said springs will serve, as soon as the impression-lever is released from the type-lever, to force the type-lever to its normal position; but when the type or impression head of the lever shall have assumed its normal facing and before the lever reaches its normal position on the type-wheel the guide-plate 131 is provided, whereby the type-lever will pass through a slot 132 in the plate, and the form of the slot will insure that the arms 115 and 116 shall assume the right position, since they could not pass through the slot when in any other position.

I will now describe in detail the connections between the driving mechanism, the sector operating the cylinder B, the impression-lever 133, and keys, which connections have been heretofore casually alluded to, the construction being shown particularly in Figs. 2 and 3. The disk 31 is provided with a cam-groove or recess 136, comprising a concentric section $b$ and a section $b'$, eccentric to the center of the groove, the latter having about one-third the circumference of the disk, and at one point of connection of the eccentric and concentric sections of the cam-groove the said groove is enlarged, as shown at $b^2$ in Fig. 2. The disk turns in the direction of the arrow or toward the left, and a pin 137 is secured upon its periphery at a point nearly diagonally opposite where the cam-race enlargement or pocket $b^2$ is located. The only connection between the rod 34, actuated from the disk 31, and the toothed sector 33 is the spring 36; but the rod is guided in its movement by an arm 138, having an attached sleeve 139, whereby the arm is loosely mounted upon the transverse shaft 32 and forms a loose crank extension of the same, as shown in Figs. 2 and 3.

It will be understood that each key is provided with a rear long guide-standard 49 and a forward short one, 50. (See Figs. 6, 7, and 8.) When a key is depressed, the short standard of that key will be brought in contact with a bow-shaft 140 and depress the same until its downward movement is checked by a stop 141, located at the front inner face of the casing. The various positions of the bow-shaft are shown in Figs. 2$^a$, 5, 6, 7, and 8. The body of the bow-shaft extends longitudinally in front of the cylinder B, its ends being carried rearward at the end portions of the cylinder and journaled, respectively, in the right-hand end of the casing and in the partition 43$^a$, as shown in Figs. 2$^a$ and 3$^a$. The left-hand end of said shaft has a crank 142, and said crank 142 is connected by a link 143 with a crank-arm 144 at one end of a horizontal shaft 145, mounted to rock in the bottom portion of the casing. The opposite or innermost end of the rock-shaft is near the periphery of the disk 31 and is secured to a brake 146, designed for use on the disk, which brake is shown in Figs. 2, 9, and 10. The brake consists of a body secured to the rock-shaft and two upwardly-extending arms $d$ and $d'$. The arm $d$ is the longest and is the actual brake-arm, being provided with a plain crank $d^2$ at its upper end for engagement with the disk-pin 137. The object of the shorter member or arm $d'$ is to prevent the disk 31 from turning more than a complete revolution for each movement of the brake. The two arms, while they diverge slightly, face one another, and the shorter arm is also provided with a crank $d^3$, which extends in direction of the longer arm, as is clearly shown in Fig. 10.

The impression-lever 133 is usually of angular shape, as disclosed in Fig. 9, and its upright member is secured upon a rock-shaft 147, provided with a crank-arm 148. The shaft 147 is journaled at one end in a standard 149, supported from the main bearing 40, and at the other end the shaft is journaled in a cross-bar 150, as shown in Fig. 3. A link 151 is attached to the crank-arm 148, as shown in Fig. 9, and also to the free end of a lever 152, fulcrumed at its opposite end in bearings 153 at the bottom of the casing. A pin 154 is secured to the lever at or near its center, extending into the cam groove or race 136 of the disk 31. A projection 155 is formed at the lower portion of the link 151, and a spring 156 is secured to the projection and a fixed support. The tendency of the spring 156 is to draw the link downward and so rock the shaft 147 as to raise the impression-lever.

In the operation of the machine let it be supposed that one or more keys have been struck and that the points 61, corresponding to those keys, have entered or are clear of the cylinder B, according to the combination of keys employed. The key or keys that have been struck bear down the bow-shaft 140 through the medium of their front standards 50. As the bow-shaft descends it communicates movement to the rock-shaft 145 through the connecting-link 143, the movement of said shaft being such as to remove the brake 146 from the disk 31, leaving the latter free to turn. As the disk revolves it carries with it the connecting-rod 34, causing the descent of the crank-arm 138 and drawing also upon the spring 36, connected with the toothed sector 33. By reason of this spring the toothed sector will be caused to descend and impart movement to the pinion, it being understood that the power of the motor is constantly applied to the shaft upon which the disk 31 is secured. The movement of the pinion 38 produces the revolution of the shaft 39 and consequent movement of the type-wheel C, the gears 41 and 42, the shaft 43, and the cylinder B when the latter is coupled to the shaft 43. This movement will continue until the points 61, corresponding to the combination struck, stop the cylinder B, and consequently stop the type-wheel in the place corresponding to this combination; but as the movement of the disk 31 continues the only thing that it will do is to tighten the spring 36. The bow-shaft may be returned to its initial position by the return of the controlling mechanism connected with said shaft.

It will be well to note here that the maximum movement of the cylinder B—that is, when it makes a complete revolution—corresponds to the third part of a revolution of the disk 31, so that when the disk 31 arrives at this point of its movement the type-wheel C will certainly be situated conveniently for the printing of the special type. The moment after the disk 31 has made a third part of its movement the pocket $b^2$ in the cam-groove will receive the pin 154 of the lever 152, permitting the lever to drop and, with the assistance of the spring 156, draw down upon the link 151, rocking the shaft 147 and lifting the impression-lever 133, the impression of the desired type being thus obtained. (See Fig. 9.) Before the disk 31 ends the second third of its movement the eccentric portion $b'$ of the cam-groove 136 will bring the lever 152 and all the parts connected with it back to their initial position, so that when the disk 31 makes the third and last part of its movement the rod 34 returns to its first position, as do also the sector 33, the type-wheel C, and the cylinder B. The pin 137 of the disk 31 now engages the brake 146 for the disk and all of said parts remain in their normal position, which is shown in Figs. 2, $2^a$, 3, and $3^a$, the mechanism being ready for the impression of a new type.

It may sometimes happen that at the end of the movement of the disk 31 the standards 50 of the keys may not ascend, and the brake-piece 146 would not be returned to its initial position, and under such conditions the disk would continue to turn. This is obviated by using the auxiliary brake-arm $d'$ in addition to the actual brake-arm $d$, as shown in Fig. 10. Under such an arrangement if the actual brake-arm should still remain out of the path of the pin on the disk the pin would strike the auxiliary brake-arm $d'$ and the disk would be prevented from revolving until the actual brake would respond, and in doing so it would simply be substituted for the auxiliary brake, and the disk would move a distance equal only to that between the crank-heads of the said brake-arms. Each time that a key is struck the disk 31 will make one revolution only.

Each lever of the type-wheel is provided with a plate 157, located just below the type-head, and this plate acts largely as a space-measurer when a lever is carried up to printing position. When a type-lever occupies such a position, it will engage with a spacing-lever 158, (shown particularly in Fig. 3,) which is pivoted upon a suitable standard 159. (Shown also in Fig. 9.) A rod 160 is connected with the free end of the lever 158, and said lever is struck and moved in direction of the left-hand end of the machine when a type-lever is in the aforesaid printing position. The rod 160 is pivoted to an arm 161, the said arm being attached to a transverse shaft 163, which is shown in Figs. 3 and 9. A lever 164 is attached to the rear portion of the shaft 163, and said lever may be a continuation of the arm 161, and near the forward end of said shaft 163 a second lever 165 is attached. The lever 164 is provided at its lower end with an attached pawl 166, which engages with a rack 167, forming a portion of the paper-carrier, to be next described. The lever 165, attached to the shaft 163, is adapted to be operated by a pin 168, projected from the disk 31 through the medium of the lever-arm 165. (Shown in Figs. 2, 3, and 9.) Each lever-arm 164 and 165 is of a length double that of the arm 161, connected with the rod 160, so that the ends of the lever-arms 164 and 165 move a distance equal to the width of the letter being printed, since when a letter is being printed the plate 157 corresponding to that letter will cause the lever 158, and consequently the arm 161, to move to the left a distance equal to half the width of the type.

Let it be supposed that a type has made an impression, and consequently the lever-arm 164 has moved to the right, the pawl 166 passing over a certain number of teeth. When the disk 31 passes through the last third of its movement, its pin 168 will encounter the lever-arm 165, raising it, and consequently carrying the pawl to the left, moving the paper-carrier the same distance and in the same direction. A second pawl 169, pivoted in the casing 169$^a$, likewise engages with the rack 167, holding it while the first pawl moves for a second grip.

The paper carrier or carriage D is particularly shown in Figs. 21 and 21$^a$; also in Figs. 3 and 3$^a$ and in Figs. 9 and 22. The back plate 169$^a$ of the casing may be solid or of skeleton form; but between the bottom of the casing and bottom of said back plate a space occurs. Peripherally-grooved guide-wheels 171 are journaled upon the outer face of the back at top and bottom, upon which wheels a carriage or paper-carrier is mounted. The body of the carriage consists of a frame 170, having forwardly-extending top and bottom flanges 173, each flange being provided with a rib 174, adapted to enter the grooves of the wheels 171. The lower flange is the widest and extends within the casing through the space at the bottom and supports the rack 167, heretofore referred to.

The paper 177 or other material to be typewritten is placed between two frames 175 and 176. These frames are preferably of skeleton construction, and one is back of the other, the space or pocket for the paper being open at top and bottom. The frame 175 is secured to the body-frame 170 in any approved manner, as is likewise the frame 176, attached to the frame 175. The attachment of these frames is preferably made in an adjustable manner—for example, as illustrated in Figs. 21 and 21$^a$, wherein keyhole-slots 178 are produced in the frames, receiving screws 179. The frames 175 and 176 may be separated any required distance. The frame 176 is provided with a central upright 180 and at its back with a sliding longitudinal bar 181. The bar is secured to a standard 182, held to slide in guides 183 upon the upright 180.

Two sets of gripper-plates 184 and 185 are provided for the paper, one pair of grippers being below the other and one gripper of each pair at opposite sides of the upright 180. The grippers are transversely curved, as shown in Fig. 22, and the edges designed to engage with the paper are flexible or covered with a yielding material. The grippers of the upper pair are mounted upon the same rod 186, journaled upon the frame 176, and the lower pair of grippers is attached to a rod journaled upon the sliding bar 181. The right-hand end of the rod 186 is provided with a crank 186$^a$, and a crank 187$^a$ is provided for the rod 187. These cranks are both engaged by a plate 188, secured to a rod 189, held to turn upon the rear frame 176, which rod has a handle 190, arranged to extend toward the front portion of the machine. Through the medium of this plate 188 and handle 190 both grippers may be held from engagement with the paper whenever desired.

The frames 175 and 176 extend beyond the top of the casing. The upper forward face of the rear frame is provided with a yielding surface 197, against which that portion of the paper rests that is to be struck by the type, as shown in Fig. 22, and the front frame has an opening therein at the top to admit the type-head of a type-lever, as shown in Fig. 9.

The sliding standard 182 is normally held in its lowest position by a spring 191, bearing upon its upper end, (see Fig. 21$^a$,) and said upper end is provided with an eye 192. An end of a lever 193 enters the eye 192, the pivot-pin 194 of the lever being near its center and secured to the rear frame 176. The outer end of the lever 192 extends beyond the left-hand end of the frame 176 to about on a line with the left-hand end of the casing and is connected by a link 195 with a shorter lever 196. This lever 196 is carried downward and pivoted to the frame 176, as is also best shown in Fig. 21$^a$. As the paper is passed vertically through the machine it is necessary (when the machine is portable) to place it on the edge of the paper on which it is to be used or to provide a table with a groove through which the paper can be passed if the machine is to be fixed. This arrangement for the paper makes it possible to write on thick or on thin paper or a single sheet or a card or paper of any desired length. The part of the lever 196 which remains on the frame 176 is sufficiently wide to engage a bar 198 at the back of the machine, as is best shown in Figs. 3 and 39. In Figs. 21 and 21$^a$ it may be seen that when the bar 198 is lowered said bar will cause the lever 196 to descend, which in turn will cause the lever 193 to raise the gripper 185, and consequently draw upward the paper, causing it to move to the next line. The gripper not raised simply acts as a detent, preventing the paper from slipping downward. If now the bar 198 returns to its normal position, the spring 191 will return all the parts moved to their former positions. Let it be supposed that one line has just been written—that is, the paper carriage or carrier has moved a certain distance (see Figs. 21 and 21$^a$) and that it is returning to the position necessary for writing the next line and the bar 198 has descended. In this event when the carriage moves it will engage the bar 198, causing a change of line, so that when the movement of the carriage or carrier is ended the paper will be in convenient position for continuing the writing. Another manner of changing a line consists simply in pressing a finger of the hand on the lever 193.

The movement of the bar 198 is as follows, reference being directed to Figs. 2, 2$^a$, 3, 3$^a$, and 39: This bar 198 is provided with two right-angled members, so arranged as to turn around the points 199. At one end 200 the bar 198 is connected to the vertical bar 201, and this latter bar is connected at its lower end to an elbow-lever 202, the smaller arm of which is provided with an aperture, through which is passed the horizontal rod 203, which rod extends practically from one end of the casing to the other. The horizontal rod 203 is provided at each end with a crank or elbow, a horizontal one 205 on the left-hand end and a vertical one 206 on the right-hand end, a spring 204 being attached to the casing and to the horizontal crank 205. (See Figs. 3 and 39.) The horizontal rod 203 is provided near the middle of its length with a tooth 207, which tooth when the rod moves to the right slides on an inclined plane 208, secured at one end of a lever 209, fulcrumed between its ends at 209$^b$, (see Figs. 37 and 38,) and thereby causing the opposite end of the lever 209 to rise, which end is provided with a plate or bar 209$^a$, that rests normally beneath the heads of the pawls 166 and 169, which heads of the pawls extend beyond the rack 167. When the bar 209$^a$ is thus raised, it carries the pawls 166 and 169 out of engagement with the rack 167, as shown in Fig. 38. The rack 167 is connected at its left-hand end to one terminal of a metallic ribbon 211, the said ribbon being wound on the drum 212, located below the cylinder B, said drum being provided with a spring 213, tending to revolve it in the direction indicated by the arrow.

Let it be supposed that a line has been finished. In order to turn to the next line, the button 11 (shown in Fig. 1) must be carried along its grooves, thus winding up the motor-spring. (See Figs. 2, 2$^a$, 3, and 3$^a$.) When this button reaches the end of its movement, it strikes the vertical elbow 206 of the bar 203, carrying said bar along with it at the end of its movement. The first thing that happens will be that the tooth 207 will slide on the inclined plane 208, and consequently raise the pawls 166 and 169 free of the rack 167, (see Fig. 38,) leaving the paper-carrier also free, which by the action of the drum 212 and the metallic ribbon 211 will move to the right again very rapidly. When the button 11 is near the end of its movement, the bar 203 by means of its elbow 205 will move the elbow-lever 202, and this action, as has been described, will cause the bar 198 to descend, thus changing a line, whether the bar 198 descends before or after the lever 196 has reached the point at which it is intercepted. The only object of the drum 212 is to cause the paper-carriage and the parts attached thereto to move to the right—that is, by means of the spring 213, the drum 212, and the metallic ribbon 211 the paper is caused to move so that a new line can be begun.

It will be understood that when desired the button 11 may be stopped when it has elevated only the pawls 166 and 169, in which case the carriage can move without changing a line, which is very necessary when it is desired to make a correction in the writing. Finally, in order to mark the distance between the lines there is a disk 213$^a$, (see Figs. 3, 22, and 23,) which disk is provided in its circumference with steps 214 of various lenths, which stop the movement of the rod 198 at the desired height. This disk is placed in its desired position by means of a button 215, with which is connected a pointer 216, which indicates on a scale 217 the desired distance between the lines. A pin 213$^b$ on the bar 198 (see Fig. 3) is employed to indicate or mark the width of the lines when said pin is struck by the steps 214 on the disk 213$^a$. To place the paper in position or to remove it from the machine, it is simply necessary to manipulate the hand 190 (shown in Fig. 21) in a manner to rock the two keeper-plates 186 and 187 rearward, thus leaving the paper free.

Since the paper is passed vertically through the machine, it is necessary (when the machine is portable) to place it on the edge of the table upon which it is to be used or to provide the table with a groove through which the paper can be passed if the machine is to be fixed. This arrangement for the paper makes it possible to write on thick or on thin paper, on a single sheet, on a card, or on paper of any desired length.

In Fig. 25, D' presents another form of guide for the paper, and consists of two plates 218$^a$, that are attached to the frame 176 of the carriage D by set-screws 218$^b$ or their equivalents. Spring-controlled brackets 218$^c$ are pivoted near the upper inner portions of the plates, and in these brackets the trunnions of a cylinder 218$^d$ are journaled, the cylinder being covered with rubber or a like material. When the paper is in roll form, the paper is perforated at desired intervals, and the drum 219, upon which it is wound, is journaled in the lower portion of the plates 218$^a$.

In Fig. 23 two bars 221 and 222 are shown in the upper part of the machine, and on these bars blocks 223 and 224 are held to slide, being held in position by means of set-screws or their equivalents. The block 223 serves to stop the carriage at the beginning of the line, for which purpose an attachment 225 is secured to the plate 170 of the carriage, adapted to engage with the said block, stopping the movement of the carriage. On the second block 224 a small bell E is mounted. (Shown on a larger scale in Figs. 28 and 29.) An attachment 226 is made to the plate 170 of the carriage, as illustrated in Fig. 23, which attachment is adapted to engage with a toothed rod 227, held to slide on the block 224 and cause said rod to engage with the hammer of the bell. When the sliding rod 227 is thus brought into action, the bell sounds several times before the movement is stopped, and the rod is only brought into operative engagement with the hammer when the end of a line is reached.

In the matter of the inking device the inking arrangement is shown particularly in Figs. 2, 2ª, 23, and 24. Two drums 229 and 230 are pivoted in a compartment 231, formed over the motor mechanism in the upper part of the machine. An inking-ribbon 232 is attached to and rolled around one of these drums, and the ribbon after passing in front of the type in the direction shown in Fig. 24 is wound upon the other drum. In said Fig. 24 the cover-plate 14 for the top of the casing is shown as lifted, and the inking device connected with the cover is open. The guide for the ribbon is shown in Figs. 26 and 27, which guide consists of a plate 235 and two rods 236 and 237, which extend in opposite directions from opposite corners of the plate, the rods 236 and 237 being connected by a pivot-bar 238. Thus the lower portion of this guide device is in the nature of a skeleton triangle. An opening 234 is made in the cover, extending through from a point near the back to its forward end, the opening being so placed as to cover the opening 233 in the casing through which the type-levers pass when carried upward to print. The pivot-pin 238 of the guide extends across the front end of the opening 234, being pivoted in the cover, and is usually controlled by a spring in such manner as to cause the guide to normally lie flat in the said opening. The ribbon 232 after having passed from the drum 230, for example, as is also shown in Fig. 24, is carried over suitable guides to the right-hand edge of the opening 234, is then carried over the rod 236 of the guide across the base of the guide to the opposing rod 237, and is from thence carried parallel with and along the left-hand wall of the slot 234 over another guide to a connection with the other drum 229, the direction of the inking-ribbon being indicated by the arrows in the said Fig. 24, from which it will be observed that the two strands of ribbon extend substantially parallel some distance from the drums, one being back of the other. Normally the guide, with the ribbon passed over it, lies, as stated, substantially flush with the top of the cover 14, as shown in Fig. 1. The upwardly-ascending head of the type-lever will engage the plate 235 of the main guide of the ribbon and carry the said plate upward with it, thus bringing the portion of the ribbon stretched over the base of the guide to a vertical position in front of the paper on which the impression is to be made and in the path of the type-head as it moves to the paper. Thus the type strikes the ribbon first and forces the ribbon against the paper. It will be understood that as the ribbon guide or carrier ascends, the type-head leaves the plate 235 of said guide, since the plate after being struck by the type-head quickly leaves said head, and when the ribbon-guide assumes its upright position the plate 235 will be out of the path of the type-head, and said head will engage with the ribbon at a point in the guide between the arms 236 and 237. When the type-lever drops, the guide is restored to its normal position by means of the spring above mentioned.

The movement of the ribbon is obtained by means of an elbow-lever 239 and connected parts, as shown in Figs. 3, 35, and 36. This lever is mounted in the forked end of the vertical bar 240, as illustrated in Figs. 2, 34, and 35, which bar terminates at its lower end in a fork 240ª, and said fork is connected with the eccentric 241, located upon the shaft 30. At the opposite end of the lever 239 an arm 242 is located, having a bifurcated head 243 at its front end. This arm 242 is provided with a reduced extension 242ª, which extension is passed through an aperture formed in the lower portion of the vertical bar 243ª, and said bar is provided with a bifurcated head 244, smaller than the head 243, but the two bifurcated heads are substantially in the same horizontal plane, as shown in Figs. 35 and 36. The head 243 has an end movement to and from the drums, and the head 244 a sidewise rocking movement. The bar 242 may move a trifle to the right or to the left through the medium of an elbow-lever 239. Thus at each turn of the disk 31 the lever 239 makes a back-and-forth movement, causing the ribbon-drums to rotate in a direction to feed the ribbon, as shown in Fig. 36, by reason of the members of the bifurcated head 243 engaging with the straight or shouldered surfaces of fine teeth 246, produced upon the lower peripheral portions of the drums, as illustrated in Figs. 35 and 36.

The members of the bifurcated head 243 engage simultaneously with the teeth of both drums, causing one drum—the drum 230, for example—to be turned in a direction to unwind the ribbon, and the drum 229 to be turned in a direction to wind the ribbon thereon. When the ribbon has been entirely wound upon one of the drums and it is desired to return the ribbon to the empty drum, a cap 245, secured to the vertical bar 243ª, is turned by hand and the bifurcated head 244 of said bar will be laterally reciprocated, whereupon the members of the head 244 are brought in alternate wedge-like engagement with the inclined or curved surfaces of the teeth of the drums 229 and 230, and it is obvious, by reference to Figs. 35 and 36, that when the head 234 is operated the drum 229 will be rotated in a direction to unwind the ribbon, while the drum 230 will be rotated in a direction to wind the ribbon thereon. The drums are held stationary by tension devices, which may be in the nature of springs 232, until said drums are acted upon by either of the heads 243 or 244, as shown in Fig. 35.

It will be observed that the bifurcated returning-head 244 is operated by hand through the manipulation of the cap 245 of the bar 243ª, such action serving to produce rewinding of the ribbon, while the bifurcated head 243 is automatically operated to feed the ribbon during the printing process.

Having thus described my invention, I claim as new and desire to secure by Letters Patent—

1. In a type-writer or a like machine, a motor-operated shaft, a type-wheel mounted upon said shaft, a type-controlling cylinder arranged to regulate the movement of said shaft, and having two movements upon its axis, one of rotation and the other endwise, and keys arranged to limit the movements of the said cylinder, substantially as described.

2. In a type-writer, or like machine, a motor-operated shaft, a type-wheel mounted upon said shaft, a second shaft driven from the motor, a type-controlling cylinder arranged to limit and time the movement of both shafts, keys arranged to induce and limit the movements of the cylinder, and a shifting connection between the driven shaft and cylinder, substantially as described.

3. In a type-writer or like machine, a motor-operated shaft, a type-wheel mounted upon said shaft, a cylinder controlled by five keys, having its surface prepared to be operated upon by a single key or by a combination of keys, said cylinder being capable of two movements upon its axis, one of rotation and the other endwise, and a controlling connection between the cylinder and type-wheel, substantially as described.

4. In a type-writer or like machine, the combination, with a motor-operated shaft, type and levers therefor, and keys and their levers, of a type-controlling cylinder capable of rotary and end movement and having its surface so prepared that it may be operated upon by a single lever or by a number of levers simultaneously brought into action, and means for limiting the movement of the cylinder by the movements of the keys, substantially as described.

5. In a type-writer and like machines, the combination, with a motor-operated shaft, a type-wheel mounted upon said shaft, provided with type-levers and an impression-lever for the type-levers, of five keys, a regulating device controlled by the five keys and arranged to control the presentation of the type-levers to the impression-lever, the said regulating device including a cylinder having its surface so prepared that it may be operated upon by a single lever or by a number of levers simultaneously brought into action, whereby the movement of a large number of type characters may be controlled by a predetermined number of keys, as set forth.

6. In a type-writer or similar machine, a type-wheel mounted to rotate and provided with type-levers and a series of keys and their levers, of a type-controlling cylinder having its surface so prepared that it may be operated upon by a single key-lever or by a number of such levers, devices for limiting the movement of the cylinder by the movement of the keys, a connection between the cylinder and the type-wheel, and means, substantially as described, for controlling the movement of the type-wheel levers, for the purpose stated.

7. In a type-writer, or like machine, the combination, with a type-wheel having type-levers, and an impression-lever arranged to raise the type-levers, of a cylinder having a slotted periphery, keys, levers operated by the key adapted to enter the slots of the cylinder limiting its movements, a controlling connection between the cylinder and type-wheel, a motor, a cam, a driving connection between the cam and the supports for the type-wheel and cylinder, and a lifting device for the impression-lever, operated also by said cam, substantially as described.

8. In a type-writer or like machine, the combination, with a type-wheel provided with type-levers, an impression-lever arranged for engagement with the type-levers, and a spacing device, of a motor, a cam driven by the motor, a driving connection between the cam and supports for the type-wheel, and means, substantially as described, for operating the spacer, and for operating the impression-lever from said cam, the first third of the movement of said cam placing the type-wheel for a selected type to make its impression, the second third of the movement causing the type to make its impression, and at the last third of the movement of the cam all the parts returning to their initial position, the paper moving a distance equal to the width of the type operated, as set forth.

9. In a type-writer, or like machine, the combination, with a drive-shaft, a type-wheel carried by said shaft, a second shaft driven therefrom, a key-operated type-controlling cylinder loosely mounted upon the driven shaft, and a shifting connection between the cylinder and its shaft, of a motor, a cam driven from the motor, a rocking toothed sector in gear connection with the drive-shaft, a connecting-rod pivoted to the cam, and a yielding connection between the connecting-rod and sector, substantially as described.

10. In a type-writer or a like machine, the combination, with a drive-shaft, a type-wheel carried by said shaft, a second shaft driven therefrom, a type-controlling cylinder having connection with the driven shaft and provided with graduated slots, keys, and levers connected with the keys and having extensions adapted to enter the slots in the cylinder, of a motor, a cam driven by the motor, a rocking toothed sector having gear connection with the drive-shaft, and a connecting-rod pivoted to the said cam, a pivoted arm for the connecting-rod, and a spring attached to said rod and to the sector, as and for the purpose set forth.

11. In a type-writer or like machine, the combination, with a shaft, a type-wheel mounted upon the same, having type-levers, a rocking sector in gear connection with the shaft, an impression-lever adapted to lift the type-levers, and a spacing device, of a motor, a cam driven by the motor, having a groove in one face the major portion whereof is concentric and the minor portion eccentric, a pocket being formed in the groove at the junction of these two portions, a rod connecting the cam and the sector, a lift-lever provided with a pin that enters the groove in the cam, a sliding rack, and a connection between the cam and spacing device, and the spacing device and rack, substantially as described.

12. In a type-writer or like machine, the combination, with a type-wheel provided with type-levers, an impression-lever, a spacing device and type-keys, of a motor, a cam driven by the motor and having a peripheral projection, a driving connection between the cam and support for the type-wheel, means, substantially as described, for operating the impression-lever from the cam, and a brake for the cam, which brake is adapted to be removed from the cam projection when a key is depressed and brought into the path of the projection when the key is raised, substantially as described.

13. In a type-writer or like machine, a motor, a series of five keys, a type-controlling cylinder rotated by the motor and capable of end movement, and a connection between each key and the cylinder, limiting its rotary and longitudinal movements, as and for the purpose specified.

14. In a type-writer or like machine, a motor, a series of five keys, a type-controlling cylinder capable of rotary and longitudinal movements, the said cylinder being actuated by the motor, the cylinder being provided with five diametrical slots corresponding to the five keys, and levers operated from and corresponding in number to the keys, being arranged to enter the slots in the cylinder and regulate its movements, substantially as described.

15. In a type-writer or like machine, a motor, a series of five keys, a type-controlling cylinder mounted to revolve and having end movement, the said cylinder being provided with five diametrical slots of varying length, corresponding in number to the number of keys, and levers operated by the keys, being arranged to enter or to withdraw from the cylinder-slots according as a key is pressed or released, substantially as described.

16. In a type-writer or like machine, a series of five keys, a type-controlling cylinder provided with five diametrical slots of varying length, corresponding in number to the number of keys, said slots having also a number of graduated steps, and levers operated by the keys, having extensions to enter the cylinder-slots, as and for the purpose set forth.

17. In a type-writer, or like machine, a motor, a shaft driven thereby, a type-controlling cylinder loosely mounted upon the shaft and capable of end movement, said cylinder being provided with diametrical slots having a taper at one end, a connection between the shaft and cylinder, keys corresponding in number to the number of cylinder-slots, and levers operated by the keys, arranged to enter the said slots and regulate the rotary and end movement of the cylinder, substantially as described.

18. In a type-writer, or like machine, a motor, a series of five keys, a type-controlling cylinder rotated by the motor, said cylinder being provided with five diametrical slots having a varying number of steps, a regulating-lever for each key, and an arm controlled by each lever, said arms being arranged to enter the cylinder-slots, substantially as described.

19. In a type-writer or like machine, the combination, with a motor-operated shaft, a type-controlling cylinder loosely mounted upon said shaft, capable of rotary and of end movement, said cylinder having diametrical slots of varying length and a varying number of steps, the entrance end of each slot being tapering, of keys corresponding in number to the number of cylinder-slots, a connection between the shaft and the cylinder, and levers operated by the keys, arranged to enter the cylinder-slots, substantially as described.

20. In a type-writer or like machine, a type-controlling cylinder provided with slots of varying length and of a number corresponding to the number of type-keys employed in the machine, the said slots having a number of graduated steps at their terminal portions, sundry of the slots having one of their walls tapered at the mouth, substantially as described.

21. In a type-writer, or like machine, a type-controlling cylinder provided with a series of slots of varying length, corresponding in number to the number of keys employed, sundry of the slots being provided with a taper at their entrance ends and varying steps at their terminal ends, as and for the purpose set forth.

22. In a type-writer, or like machine, the combination, with a motor and a type-controlling cylinder rotated by said motor, provided with a series of slots of varying length, sundry of the slots being provided at their entrance ends with a tapering wall, said walls having different lengths, sundry of the slots being further provided with varying steps at their terminal ends, of keys, and levers operated by the keys and arranged to enter the cylinder-slots, substantially as shown and described.

23. In a type-writer, or like machine, the combination, with a type-controlling cylinder provided with graduated diametrical slots, and means for revolving said cylinder, of keys, levers connected with the keys, arms provided with points or projections adapted to enter the slots in the cylinder when the keys are depressed, and means, substantially as described, whereby sundry of the points or projections connected with the depressed keys may be withheld from the cylinder, as and for the purpose set forth.

24. In a type-writer, or like machine, the combination, with a type-controlling cylinder provided with a series of slots of varying length, sundry of the slots being provided at their entrance ends with a tapering wall, and sundry of the slots being further provided with steps at their terminal ends, and means for rotating the cylinder, of key-standards extending from the keys, angle-levers having sliding connection with the standards, a shaft located above the levers, and arms pivoted to the shaft, having also sliding connection with the angle-levers, each arm being provided with a point or projection adapted to enter a slot in the cylinder, as and for the purpose specified.

25. In a type-writer, or like machine, the combination, with a type-controlling cylinder provided with a series of slots of varying length, sundry of the slots being provided at their entrance ends with a tapering wall, and sundry of the slots being further provided with steps at their terminal ends, and means for rotating the cylinder, of keys, standards extending from the keys, angle-levers provided with sleeves, a fixed shaft upon which the sleeves are loosely mounted, a sliding connection between the angle-levers and standards, a rock-shaft above the fixed shaft, sleeves loosely mounted upon the rock-shaft, arms secured to the rock-shaft sleeves and having sliding connection with the angle-levers, projections from the said arms, and a restraining device connected with the levers and the rock-shaft, adapted when certain combinations of the keys are made to hold the projections of the arms from the cylinder, as set forth.

26. In a type-writer, or like machine, the combination, with a type-controlling cylinder provided with a series of slots of varying length, sundry of the slots being provided at their entrance ends with a tapering wall, and sundry of the slots being further provided with steps at their terminal ends, and means for rotating the cylinder, of keys, standards extending from the keys, angle-levers provided with sleeves, a fixed shaft upon which the sleeves are loosely mounted, a sliding connection between the angle-levers and standards, a rock-shaft above the fixed shaft, sleeves loosely mounted upon the rock-shaft, arms secured to the rock-shaft sleeves, and having sliding connection with the angle-levers, projections from the said arms, and a restraining device, consisting of a cord or chain passed through the angle-levers, being secured at one end, a spring-controlled pulley secured to the opposite end of the cord, an eccentric-pin upon the pulley, and an oval skeleton eccentric attached to the rock-shaft and embracing the pin on the pulley and the shaft on which the pulley is loosely mounted, substantially as described.

27. In a type-writer or like machine, a type-wheel consisting of a body, levers pivoted to the body, and constructed in sections capable of turning in opposite directions, and a type-bearing head carried by the sections at the free ends of the levers, substantially as described.

28. In a type-writer or like machine, a type-wheel consisting of a body, a series of levers pivoted to the body, and type-bearing heads carried by the levers, said levers being constructed in sections connected to turn independently in opposite directions and together in one direction, as and for the purpose specified.

29. In a type-writer or like machine, a type-wheel consisting of a body, a series of levers pivoted to the body, and type-bearing heads carried by the levers, said levers being constructed in sections and connected to turn independently in opposite directions and together in one direction, a spring for each lever, controlling the return movements of its sections, and the return of the entire lever when elevated and released, substantially as shown and described.

30. In a type-writer or like machine, a type-wheel consisting of a body, a series of levers pivoted to the body, and type-bearing heads carried by the levers, said levers being constructed in sections and connected to turn independently in opposite directions and together in one direction, a spring for each lever, controlling the return movements of its sections and the return of the entire lever when elevated and released, and lugs projected in opposite directions from the sections of said levers, being located where the sections meet, as and for the purpose specified.

31. In a type-writer, or like machine, the combination, with a type-wheel provided with pivoted type-levers, said levers being constructed in sections connected to turn in opposite directions, a type-bearing head carried by one section of the levers, and lugs connected with both sections of the levers, extending in opposite directions, of a slide, a flange projecting from the slide, and means, substantially as described, for carrying the flange into or out of the path of the lugs of the levers, substantially as shown and described.

32. In a type-writer, or like machine, the combination, with a type-wheel provided with pivoted type-levers, said levers being constructed in sections connected to turn in opposite directions, a type-bearing head carried by one section of the levers, and lugs connected with both sections of the levers, extending in opposite directions, of a sliding plate provided with a projecting flange, a spring-controlled rod, the movement of which imparts movement to the plate, said rod being provided with projections, and shifting levers mounted to engage said projections, one lever being arranged to impart greater throw to the rod than the other, as and for the purpose specified.

33. In a type-writer, or like machine, the combination, with a carriage having an upright pocket for the reception of the material to be printed, the pocket being open at top and bottom, of a casing upon which the carriage travels, type-levers mounted in the casing, and an impression-lever adapted to carry the type-surfaces of the type-lever into said pocket, and devices for imparting movement to the impression-lever, substantially as described.

34. In a type-writer, or like machine, the combination, with a pivoted type-lever constructed in spring-controlled sections having a hinge connection, one section being capable of turning in two directions, the other in a single direction only, and lugs attached to the sections where they connect, the lugs extending in opposite directions, of a sliding plate having a projecting flange, shifting-levers operating to carry the flange into and out of the path of the type-lever, and a guide-plate located in front of the flange, provided with an opening shaped to permit the passage through it of the type-lever and its projections, substantially as described.

35. In a type-writer, or like machine, the combination, with a carriage provided with a pocket for the material to be printed, of grippers located upon the carriage and extending into said pocket, a slide upon which one of the grippers is mounted, and a lever connected with the slide, for raising and lowering the same, said lever being operated by hand or by the movement of the carriage, substantially as described.

36. In a type-writer, or like machine, the combination, with a carriage provided with a pocket for the material to be printed, of a slide located upon the carriage, having vertical movement, a gripper journaled upon the slide, a second gripper journaled upon the carriage, both grippers being curved in cross-section and provided with yielding sections extending into the pocket, a lift-lever connected with the slide, crank-arms projected from the grippers, and a trip-lever arranged for engagement with the crank-arms, substantially as described.

37. In a type-writer, or like machine, the combination, with a casing, a spring-controlled carriage held to travel upon the casing, a rack secured to the carriage, and pawls in the casing, normally engaging the rack, of a spring-motor in the casing, a winding-tape for the motor, provided with a button held to slide in the casing, and a trip device for the pawls, operated by said button during the act of winding the motor, substantially as described.

38. In a type-writer, or like machine, the combination, with a cover arranged to extend over the outlet for the type, and provided with an opening at that point, of a ribbon-guide, consisting of a skeleton base approximating a triangular shape and pivoted at the opening in the cover, and a plate attached to the base, drums mounted to revolve adjacent to the cover-opening, and a ribbon connected with the drums, being led along the margin of the cover-opening and across the base of the guide, as and for the purpose specified.

MANUEL S. CARMONA.

Witnesses:
WM. J. CRITTENDEN,
SEBASTIAN LERDO DE TEJADA.